US008194628B2

(12) United States Patent
Ku

(10) Patent No.: US 8,194,628 B2
(45) Date of Patent: Jun. 5, 2012

(54) METHODS AND APPARATUS TO ENABLE CALL COMPLETION IN INTERNET PROTOCOL COMMUNICATION NETWORKS

(75) Inventor: Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1217 days.

(21) Appl. No.: 11/949,485

(22) Filed: Dec. 3, 2007

(65) Prior Publication Data

US 2009/0161666 A1 Jun. 25, 2009

(51) Int. Cl.
*H04W 4/00* (2009.01)
(52) U.S. Cl. ........................................ 370/338; 370/352
(58) Field of Classification Search .................. 370/338, 370/352
See application file for complete search history.

(56) References Cited

U.S. PATENT DOCUMENTS

| | | | |
|---|---|---|---|
| 6,304,565 B1 | 10/2001 | Ramamurthy | |
| 6,614,780 B2 | 9/2003 | Hakim et al. | |
| 6,865,266 B1 | 3/2005 | Pershan | |
| 6,973,091 B1 | 12/2005 | Hester | |
| 7,203,298 B2 | 4/2007 | Gilbert et al. | |
| 2002/0167943 A1 | 11/2002 | Hakim et al. | |
| 2004/0179668 A1 | 9/2004 | Gilbert et al. | |
| 2004/0183749 A1 | 9/2004 | Vertegaal | |
| 2004/0198327 A1 | 10/2004 | Bates et al. | |
| 2005/0190721 A1 | 9/2005 | Pershan | |
| 2006/0067305 A1* | 3/2006 | Kobayashi et al. | 370/352 |
| 2006/0098621 A1* | 5/2006 | Plata Andres et al. | 370/352 |
| 2006/0165068 A1 | 7/2006 | Dalton, Jr. et al. | |
| 2007/0091879 A1 | 4/2007 | Croak et al. | |
| 2007/0116250 A1* | 5/2007 | Stafford | 379/355.09 |
| 2007/0121908 A1 | 5/2007 | Benedyk et al. | |
| 2007/0127447 A1 | 6/2007 | Cho | |
| 2007/0150916 A1 | 6/2007 | Begole et al. | |
| 2007/0165613 A1 | 7/2007 | Soo et al. | |
| 2008/0313311 A1* | 12/2008 | Flemisch et al. | 709/220 |
| 2009/0093250 A1* | 4/2009 | Jackson et al. | 455/435.1 |

FOREIGN PATENT DOCUMENTS

CN 1509085 A 6/2004

* cited by examiner

*Primary Examiner* — Gary Mui
(74) *Attorney, Agent, or Firm* — Hanley, Flight & Zimmerman, LLC

(57) ABSTRACT

Methods and apparatus to enable call completion in Internet protocol communication networks are disclosed. An example method of processing a voice over Internet protocol call disclosed herein comprises failing to receive a response to a request for a numeric Internet protocol (IP) address of a destination device from a domain name system (DNS) server, querying a telephone number mapping (ENUM) server for the numeric IP address, and sending an invite message to process the call when the numeric IP address is received from the ENUM server.

19 Claims, 11 Drawing Sheets

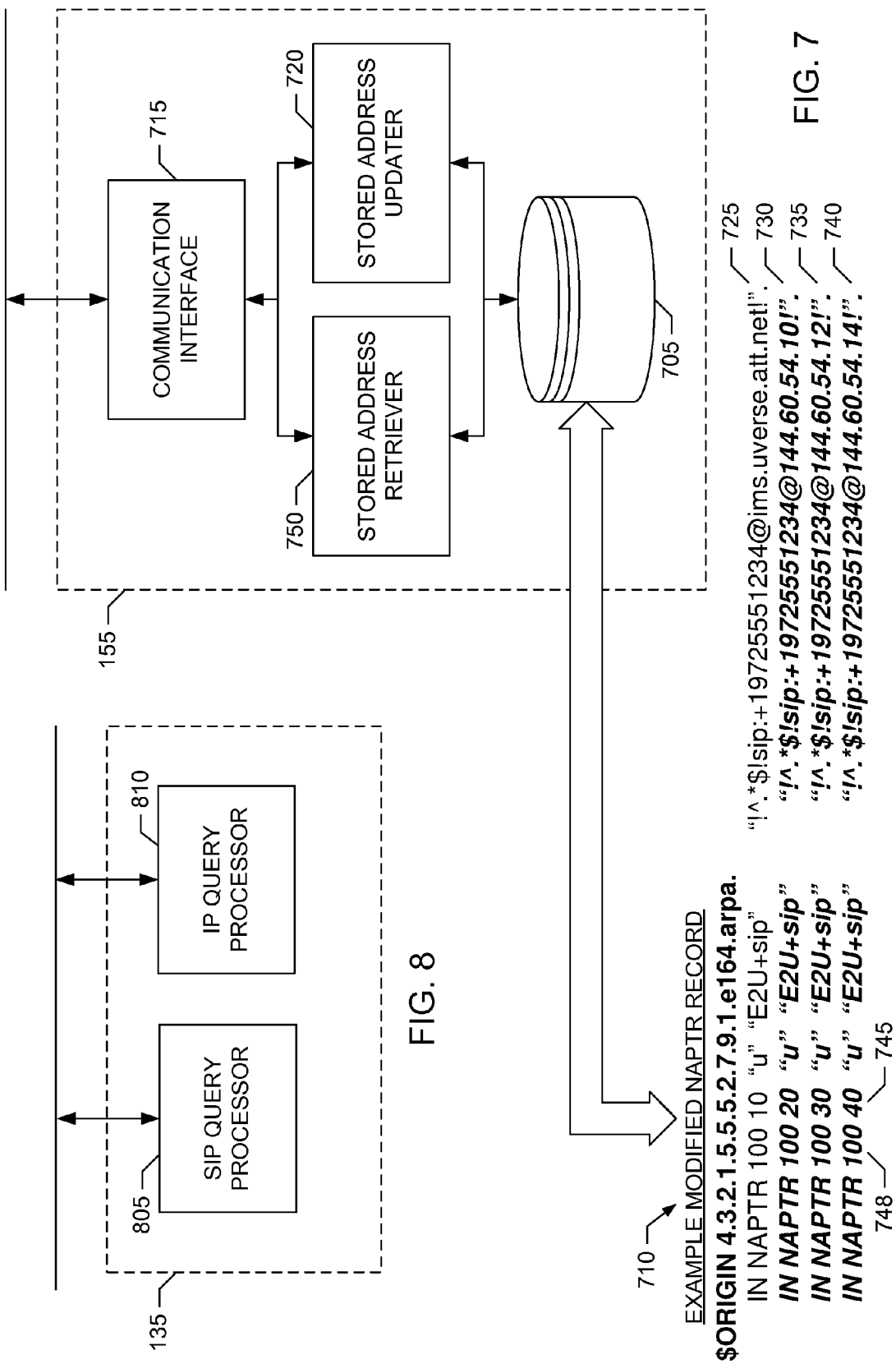

METHODS AND APPARATUS TO ENABLE CALL COMPLETION IN INTERNET PROTOCOL COMMUNICATION NETWORKS

FIELD OF THE DISCLOSURE

This disclosure relates generally to communication networks and, more particularly, to methods and apparatus to enable call completion in Internet protocol communication networks.

BACKGROUND

Today's telecommunications providers are continuing to migrate to voice-over-Internet-protocol (VoIP) networks to provide the feature-rich services and cost savings demanded by their customers. Most, if not all, telecommunications providers also want their respective VoIP networks to provide the reliability their customers have grown to expect from the traditional public switched telephone network (PSTN). However, network element failures in the existing backbone Internet protocol (IP) network and/or network failures in a provider's existing VoIP network implementation can result in call setup failures which degrade overall network reliability.

BRIEF DESCRIPTION OF THE DRAWINGS

FIG. 7 is a block diagram of an example ENUM server that may be used to implement the example IMS communication network of FIG. 1.

FIG. 8 is a block diagram of an example call processor that may be used to implement the example IMS communication network of FIG. 1.

DETAILED DESCRIPTION

Figure 1:
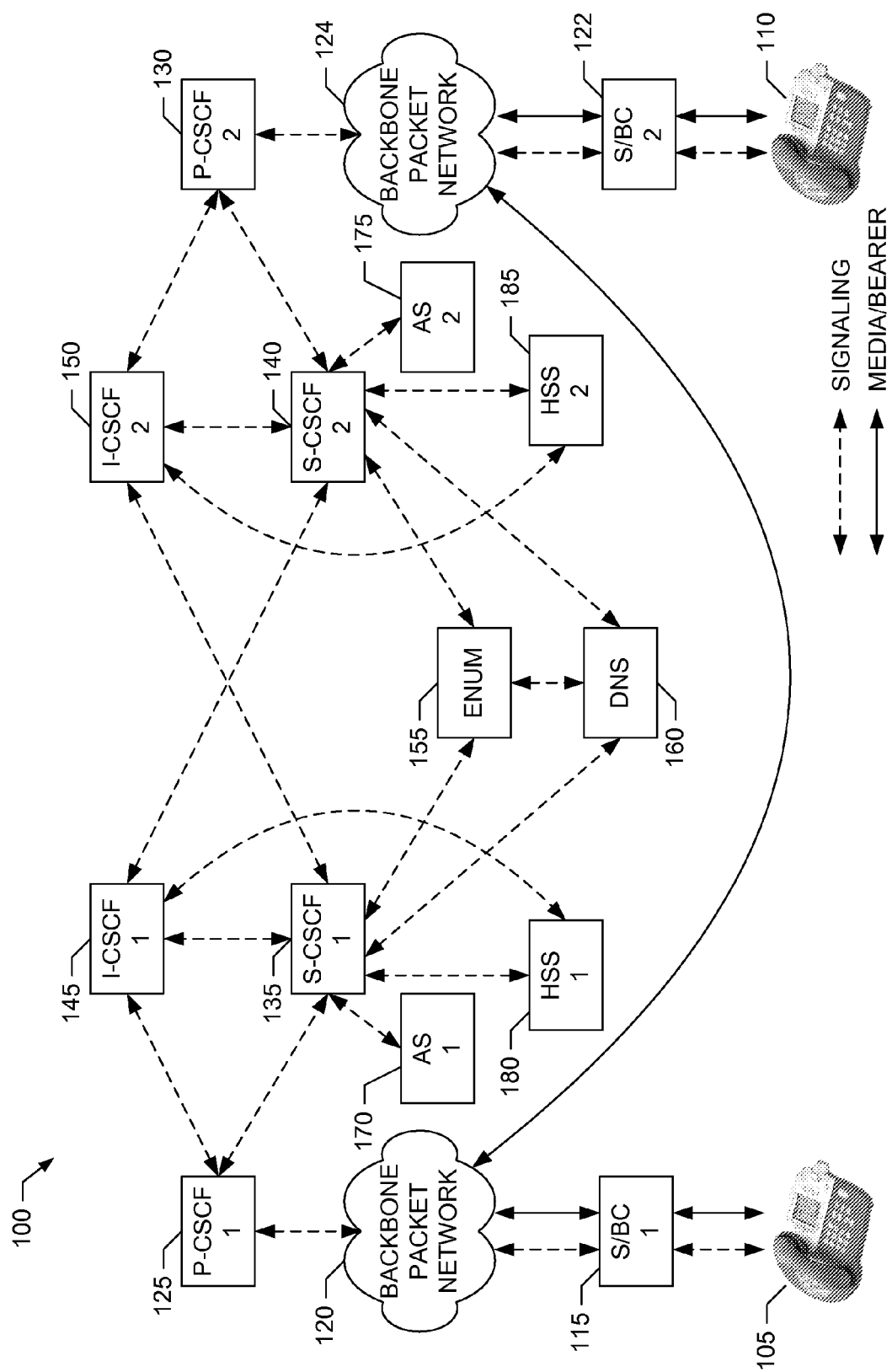
FIG. 1 is a block diagram of an example Internet Protocol (IP) Multimedia Subsystem (IMS) communication network enabling call completion according to the methods and apparatus disclosed herein.

A block diagram of an example communication network 100 enabling call completion according to the methods and apparatus disclosed herein is shown in FIG. 1. The example communication network 100 implements an Internet Protocol (IP) Multimedia Subsystem (IMS) network and includes various call processors and servers to, for example, manage calls and sessions, provide multimedia functionality, etc., for user devices (also known as User Endpoints (UEs) or Customer Premises Equipment (CPE)), such as the first user device 105 and the second user device 110 shown in FIG. 1. In the illustrated example, both the first user device 105 and the second user device 110 are IP devices operating in an IP-based network. IMS networks may be used in a variety of applications, such as, for example, to implement mobile communication networks, Voice over Internet Protocol (VoIP) communication networks, etc. Although the illustrated example depicts the communication network 100 as an IMS network, the example methods and apparatus disclosed herein are not limited to application only in IMS networks. For example, the methods and apparatus disclosed herein may be readily adapted for use in any communication network facilitating communication between user devices.

In the illustrated example of FIG. 1, dashed directional lines indicate communication paths carrying control (e.g., signaling) traffic and solid directional lines indicate communication paths carrying user data traffic. To implement an IMS network, the example communication network 100 includes a first Session Border Controller (S/BC) 115 to interface the first user device 105 to a first backbone packet network 120 implementing the example IMS network 100. The example IMS network 100 also includes a second S/BC 122 to interface the second user device 110 to a second backbone packet network 124 implementing the example IMS network 100. The S/BCs 115 and 122 provide control over the signaling and/or media streams involved in setting up, conducting, and tearing down calls. The backbone packet networks 120 and 124 may be implemented by two or more packet networks or by a single packet network.

The example communication network 100 also includes a first Proxy Call Session Control Function (P-CSCF) 125 and a second P-CSCF 130. The first P-CSCF 125 and/or the second P-CSCF 130 may be implemented by one or more servers programmed with machine readable instructions. Each such server may include one or more processors for executing instructions stored in a machine readable memory. Generally, P-CSCFs are call processors that provide an interface for routing signaling messages to appropriate destinations in an IMS network. In the illustrated example, the first P-CSCF 125 provides a Session Initiation Protocol (SIP) proxy interface for signaling messages between, for example, the first user device 105 and the rest of the communication network 100. The first P-CSCF 125 is assigned to the first user device 105 when it initially registers with the communication network 100. Similarly, the second P-CSCF 130 provides a SIP proxy interface for signaling messages between, for example, the second user device 110 and the rest of the communication network 100. The second P-CSCF 130 is assigned to the second user devices 110 when it initially registers with the communication network 100. After assignment, the first and second P-CSCFs 125 and 130 route signaling messages from the first and second user devices 105 and 110, respectively, to the appropriate destination(s) in the example communication network 100.

Continuing with the description of FIG. 1, the example communication network 100 includes a first Serving CSCF (S-CSCF) 135 to allow, for example, the first user device 105 to register with the example IMS communication network 100. Similarly, the example communication network 100 includes a second S-CSCF 140 to allow, for example, the second user device 110 to register with the example IMS communication network 100. Furthermore, the first and second S-CSCFs 135 and 140 implement call setup/teardown for the first and second user devices 105 and 110, respectively. The first S-CSCF 135 and/or the second S-CSCF 140 may be implemented by one or more servers programmed with machine readable instructions, and each such server may include one or more processors for executing instructions stored in a machine readable memory. Generally, S-CSCFs are call processors that act as registrars for registering user devices with an IMS network. S-CSCFs also route signaling messages to appropriate network elements and media servers in an IMS network to implement call setup and teardown. Additionally, the first and second S-CSCFs 135 and 140 of the illustrated example implement call completion functionality as described in greater detail below.

In the illustrated example, the first S-CSCF 135 is depicted as being assigned to user device 105 and, thereby, providing a SIP server for registering the user device 105 with the example IMS communication network 100 and providing access to a first application server 170. Similarly, the second S-CSCF 140 is depicted as being assigned to the user device 110 and, thereby, providing a SIP server for registering the user device 110 with the example IMS communication network 100 and providing access to an application server 175. The application servers 170 and 175 of the illustrated example are configured to host and execute one or more services accessible by, for example, the user devices 105 and 110. Services that may be hosted and executed by the application servers 170 and 175 include, but are not limited to, value-added call processing services (e.g., such as caller identification (ID), call forwarding, call waiting, teleconferencing, voicemail, etc.), multimedia services (e.g., such as multimedia conferencing, media content provisioning, speech recognition services, etc.), etc.

The example communication network 100 also includes a first Interrogating CSCF (I-CSCF) 145 and a second I-CSCF 150. The first I-CSCF 145 and/or the second I-CSCF 150 may be implemented by one or more servers programmed with machine readable instructions, and each such server may include one or more processors for executing instructions stored in a machine readable memory. Generally, I-CSCFs are call processors that serve as points of contact in a user device's home network domain when the user device is originating a call from a visited (e.g., roaming) domain. I-CSCFs also serve as points of contact for call originations which are destined for user devices operating in the network domain served by the particular I-CSCF. In the illustrated example, the first I-CSCF 145 serves as the destination I-CSCF for establishing a call with the first user device 105 (e.g., such as a call originating from the second user device 110 to the first user device 105). Similarly, the second I-CSCF 150 serves as the destination I-CSCF for establishing a call with the second user device 110 (e.g., such as a call originating from the first user device 105 to the second user device 110).

To enable S-CSCFs (e.g., such as the S-CSCFs 135 and 140) to be assigned to user devices (e.g., such as the user devices 105 and 110), the example IMS communication network 100 includes home subscriber servers (HSSs) 180 and 185. The HSSs 180 and/or 185 may also be implemented by one or more servers programmed with machine readable instructions, and each such server may include one or more processors for executing instructions stored in a machine readable memory. Generally, an HSS in a user device's home network receives registration requests from the user device via an intermediate signaling interface provided by, for example, an I-CSCF also in the user device's home network. The HSS, in turn, assigns an S-CSCF to the user device for subsequent call processing based on, for example, profile information, location information, etc., corresponding to the user device and stored in the HSS. In the illustrated example, the I-CSCF 145 interfaces with the HSS 180 which, in turn, assigns user devices (e.g., such as the user device 105) to, for example, the first S-CSCF 135. Similarly, the I-CSCF 150 interfaces with the HSS 185 which, in turn, assigns user devices (e.g., such as the user device 110) to, for example, the second S-CSCF 140. The HSSs 180 and 185 of the illustrated example may also be queried for profile information, etc., to enable call setups with user devices in their respective home networks (e.g., such as the user device 105 and 110, respectively).

To support call setup and enable call completion, the example communication network 100 further includes an example telephone number mapping (ENUM) server 155 and an example domain name system (DNS) server 160. The ENUM server 155 may be implemented by one or more servers programmed with machine readable instructions, and each such server may include one or more processors for executing instructions stored in a machine readable memory. The DNS server 160 may also be implemented by one or more servers programmed with machine readable instructions, and each such server may include one or more processors for executing instructions stored in a machine readable memory. Additionally, the ENUM server 155 and the DNS server 160 may be co-located in the same server implementation, or may be implemented separately.

In general, ENUM servers convert traditional telephone numbers into one or more network addresses to enable a call to be setup and completed in a VoIP network. In particular, an example ENUM server maps a telephone number of a destination user device (e.g., such as the second user device 110) from the E.164 number format into one or more SIP Universal Resource Identifiers (URIs) associated with the destination user device. In general, the E.164 number format in the United States may allow a maximum of fifteen (15) characters with a "+" prefix (e.g., such as +1-NPA-NXX-XXXX), and is the format frequently used today for representing telephone numbers. For example, the telephone number "+1-972-555-1234" is represented in the E.164 format. To allow a telephone number in the E.164 format to be processed by an IP-based device (e.g., such as the ENUM server 155), the E.164 number can be represented as a fully qualified domain name (FQDN) by reversing the telephone number and appending the zone ".e164.arpa." The International Telecommunication Union (ITU) has assigned the specific zone ".e164.arpa" to represent E.164 numbers in IP-based networks. For example, the E.164 telephone number "+1-972-555-1234" has an E.164 FQDN of "4.3.2.1.5.5.5.2.7.9.1.e164.arpa."

In an IP-based network, such as the example communication network 100, user devices, such as the first user device 105 and the second user device 110, are addressed by their assigned Uniform Resource Identifiers (URIs). In particular, unique SIP URIs are used to address the first user device 105 and the second user device 110 in the example communication network 100. For example, the SIP URI for a user device having an E.164 telephone number of "+1-972-555-1234" could be "sip:+19725551234@ims.uverse.att.net" where "ims.uverse.att.net" is the hostname of a network device (e.g., such as an I-CSCF) configured to receive incoming call requests for the user device's home network. To map an E.164 telephone number to one or more SIP URIs for a particular user device (e.g., such as the user device 105), the ENUM server 155 stores the E.164 FQDN for the user device, the one or more SIP URIs for the user device and corresponding mapping information in one or more Naming Authority Pointer (NAPTR) records maintained by the ENUM server. An example NAPTR record for a user device having an E.164 telephone number of "+1-972-555-1234" is:

SORIGIN 4.3.2.1.5.5.5.2.7.9.1.e64.arpa.
IN NAPTR 100 10 "u" "E2U+sip" "!^.*S!sip:+19725551234@ims.uverse.att.net!"

DNS servers, in turn, generally convert device URIs, such as SIP URIs and, more generally, device hostnames, into one or more numeric Internet network addresses associated with the device. The process of converting a URI (or hostname) into a numeric IP address is known as "resolving" the IP address of the target device. The numeric IP address is used to physically route messages (and, more generally, IP packets) to the target device in an IP network. In many communication networks, such as the example communication network 100, IP addresses are assigned to one or more of the network devices dynamically. Such dynamic assignment allows the example communication network 100 to re-use a limited number of available IP addresses, implement security measures that require devices to register and re-register with the network, etc. Thus, the particular numeric IP address for a given network device may change over time as new IP addresses are dynamically assigned to the device. In the example communication network 100, the example DNS server 160 maintains the current mapping of the network device's URI (e.g., its one or more SIP URIs) to its currently assigned numeric IP address. Thus, to send a message (e.g., such as a call setup message) to a particular network device, the device's current numeric IP address is obtained by querying the example DNS server 160 using the device's SIP URI.

Figure 2:
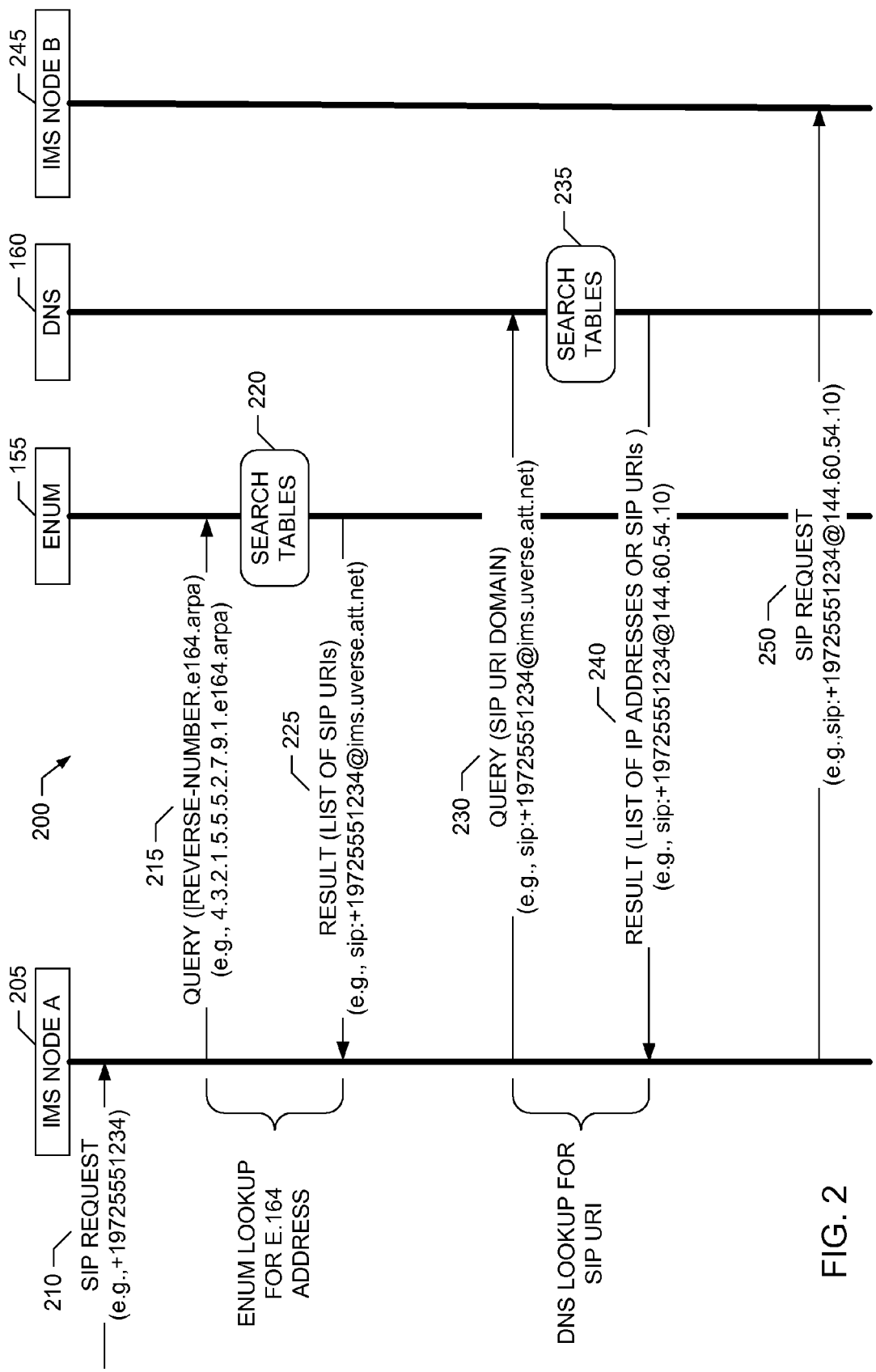
FIG. 2 is a message sequence diagram illustrating an example sequence of address mapping queries processed by an example telephone number mapping (ENUM) server and an example domain name system (DNS) to establish a call in the example IMS communication network of FIG. 1.

To more fully illustrate the mapping of E.164 telephone numbers to numeric IP addresses performed by the example ENUM server 155 and the example DNS server 160, an example message sequence diagram 200 illustrating an example sequence of address mapping queries that may be used to establish a call in the example communication network 100 is shown in FIG. 2. The example message sequence diagram 200 corresponds to a call being established with a destination device having an E.164 telephone number of "+1-972-555-1234." With this in mind, the example message sequence diagram 200 begins with an example first IMS node 205 receiving a SIP request message 210 associated with establishing a call with the destination device having the E.164 telephone number of "+1-972-555-1234." For example, if the call is being originated by the example user device 105, the example first IMS node 205 may correspond to the example first S-CSCF 135 of FIG. 1. In such an example, the first S-CSCF 135 receives the SIP request 210 in the form of, for example, a SIP INVITE message from the user device 105 with the destination address set to the E.164 telephone number (e.g., "+1-972-555-1234") of the destination device.

Next, in response to receiving the SIP request message 210, the example first IMS node 205 sends a query 215 to the example ENUM server 155 to obtain one or more SIP URIs associated with the destination device having the E.164 telephone number (e.g., "+1-972-555-1234") referenced in SIP request message 210. The example query 215 includes the destination device's E.164 FQDN (e.g., "4.3.2.1.5.5.5.2.7.9.1.e164.arpa.") as an intermediate address for the destination device. The example ENUM server 155 uses the E.164 FQDN from the received query 215 to perform a search tables procedure 220 to look up the NAPTR record(s) indexed by the provided E.164 FQDN. Upon locating the NAPTR record(s) indexed by the E.164 FQDN provided in the received query 215, the example ENUM server 155 sends a query result message 225 back to the example first IMS node 205. The example query result message 225 includes a list of the SIP URI(s) included in the NAPTR record(s) indexed by the E.164 FQDN associated with the destination device. For example, in response to receiving the example query 215 having the destination device's E.164 FQDN set to "4.3.2.1.5.5.5.2.7.9.1.e164.arpa," the example query result message 225 sent back by the example ENUM server 155 may include a SIP URI of, for example, "sip:+19725551234@ims.uverse.att.net" for the destination device. This example returned SIP URI would have been obtained by the ENUM server 155 from its stored NAPTR record(s) indexed by the E.164 FQDN "4.3.2.1.5.5.5.2.7.9.1.e164.arpa."

In response to receiving the query result message 225 from the ENUM server 155, the example first IMS node 205 next sends a query 230 to the example DNS server 160 to obtain one or more numeric IP addresses or additional SIP URIs associated with the destination device having the E.164 telephone number (e.g., "+1-972-555-1234") referenced in SIP request message 210. The example query 230 includes one of the destination device's SIP URIs (e.g., "sip:+19725551234@ims.uverse.att.net") provided in the query result message 225. The example DNS server 160 uses the SIP URI from the received query 230 to perform a search tables procedure 235 to look up (e.g., resolve) the provided SIP URI into a numeric IP address or an additional SIP URI. For example, if the DNS server 160 is an intermediate DNS server for routing messages to the destination device, the DNS server 160 may not know the device's ultimate numeric IP address. Instead, the DNS server 160 might return another SIP address for the destination device that would reference another DNS server (or network device) from which the destination device's numeric IP address may be obtained.

In the illustrated example of FIG. 2, however, the example DNS 160 does know the numeric IP address of the destination device. As such, after performing its search tables procedure 235, the example DNS 160 returns one or more numeric IP address in a query result message 240 sent back to the example first IMS node 205. The example query result message 240 includes a list of the numeric IP addresses(s) associated with the destination device whose SIP URI was provided in the query 230. For example, in response to receiving the example query 230 having the destination device's SIP URI set to "sip:+19725551234@ims.uverse.att.net" the example query result message 240 sent back by the example DNS server 160 may include a numeric IP address of, for example, "sip:+19725551234@144.60.54.10" for the destination device.

In the illustrated example, the hostname "ims.uverse.att-.net" and the corresponding numeric IP address "144.60.54.10" are associated with an example second IMS node 245 configured to receive incoming call requests for the destination device's home network. As such, the example first IMS node 205 uses the numeric IP address(es) returned in the query result message 240 to send another SIP request message 250 to the example second IMS node 245 to continue establishing the call with the destination device having the E.164 telephone number of "+1-972-555-1234." For example, if the call is being established with the example user device 110 by the example user device 105, the example first IMS node 205 may correspond to the example first S-CSCF 135 and the example second IMS node 245 may correspond to the example second I-CSCF 150. In such an example, the first S-CSCF 135 sends the SIP request 250 in the form of, for example, an encapsulated SIP INVITE message 250 to the second I-CSCF 150 with the destination address of the SIP INVITE 250 set to the SIP URI (e.g., "sip:+19725551234@ims.uverse.att.net") of the example destination user device 110. Additionally, the first S-CSCF 135 would encapsulate the SIP INVITE 250 message in a TCP/UDP message addressed to the second I-CSCF 150 using the numeric IP address ("sip:+19725551234@144.60.54.10") included in the query result message 240. The example second IMS node 245 (e.g., such as the second I-CSCF 150) then processes the received SIP request message 250 (e.g., such as the SIP INVITE message) to continue establishing the call with the destination user device (e.g., the user device 110).

Figure 3:
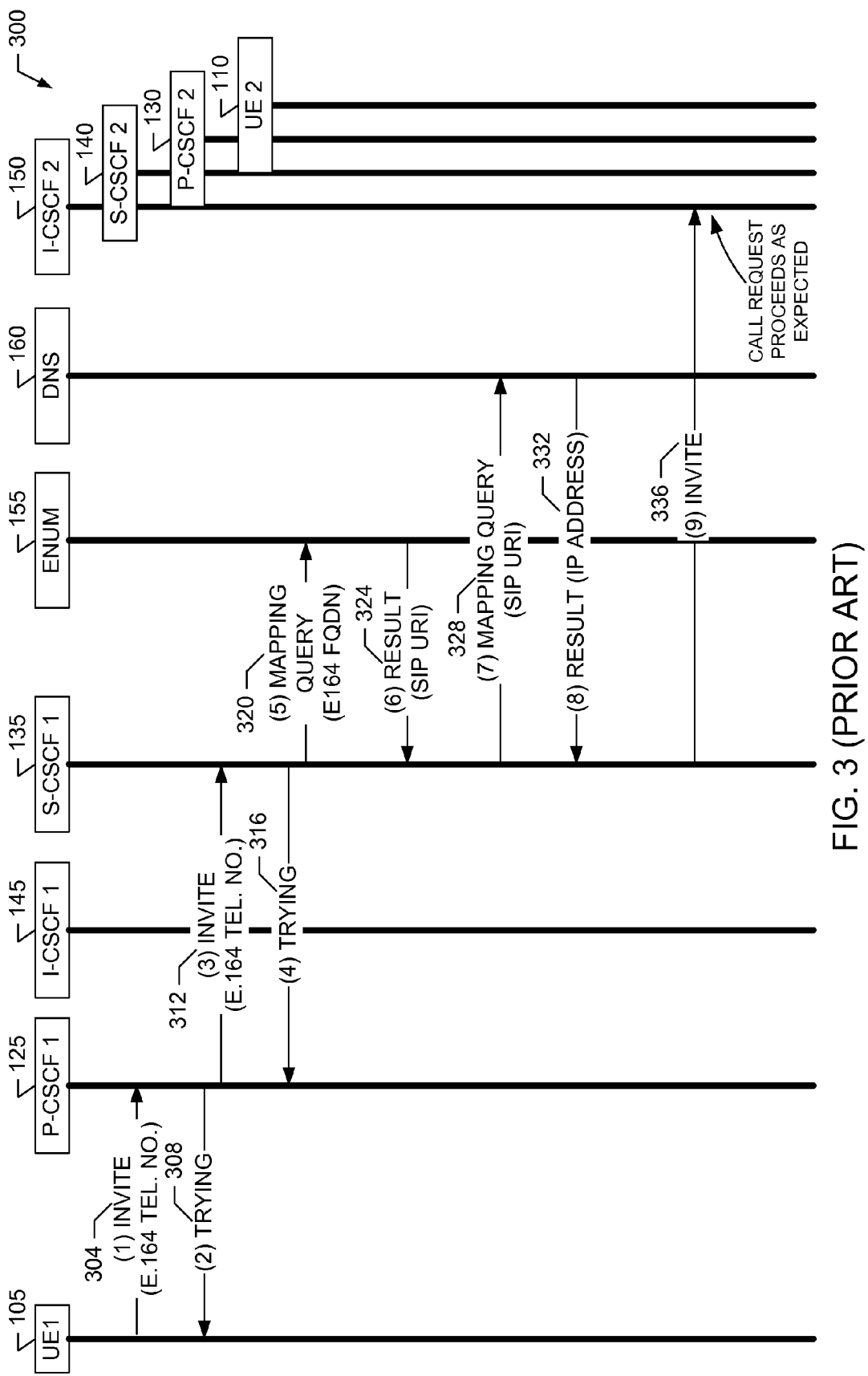
FIG. 3 is a message sequence diagram illustrating an example prior art call setup procedure that could be used to establish a call with a destination device included in the example IMS communication network of FIG. 1.

To provide a context to more fully appreciate the call completion methods and apparatus described herein, a message sequence diagram 300 illustrating an example prior art call setup procedure which could be implemented by the example communication network 100 is shown in FIG. 3. The example prior art message sequence diagram 300 begins with the example user device 105 attempting to establish a call with the example destination user device 110 by issuing an SIP INVITE message 304 that is received by the example first P-CSCF 125. The SIP INVITE message 304 includes the E.164 telephone number of the example user device 110 (e.g., such as "+1-972-555-1234") as the address of the destination device for the call the example user device 105 is attempting to establish. In response to receiving the SIP INVITE message 304, the example first P-CSCF 125 sends a SIP TRYING status message 308 back to the example user device 105. The SIP TRYING status message 308 indicates that the SIP INVITE message 304 was received and that the example first P-CSCF 125 is working to route the INVITE to the destination device (i.e., the example user device 110 in this example).

Next, the example first P-CSCF 125 continues routing the INVITE from the example user device 105 by sending another SIP INVITE message 312 to the example first S-CSCF 135. The SIP INVITE message 312 also includes the E.164 telephone number of the example user device 110 (e.g., such as "+1-972-555-1234") as the address of the destination device for the call. In response to receiving the SIP INVITE message 312, the example first S-CSCF 135 sends a SIP TRYING status message 316 back to the example first P-CSCF 125 to indicate that the example first S-CSCF 135 received the SIP INVITE message 312 and is working to continue routing the INVITE to the destination device (i.e., the example user device 110 in this example).

In response to receiving the SIP INVITE message 312, the example first S-CSCF 135 also sends a mapping query message 320 to the example ENUM server 155. Like the query 215 of FIG. 2, the first S-CSCF 135 sends the mapping query message 320 to the example ENUM server 155 to obtain one or more SIP URIs associated with the destination device (i.e., the example user device 110) addressed in the received SIP INVITE message 312. The mapping query message 320 includes the destination device's E.164 FQDN (e.g., such as "4.3.2.1.5.5.5.2.7.9.1.e164.arpa.") as an intermediate address for the destination device (i.e., the example user device 110). The example ENUM server 155 uses the E.164 FQDN from the received mapping query message 320 to look up the NAPTR record(s) indexed by the provided E.164 FQDN. Upon locating the NAPTR record(s) indexed by the E.164 FQDN provided in the received mapping query message 320, the example ENUM server 155 sends a query result message 324 (e.g., like the query result message 225 of FIG. 2) back to the example first IMS node 205. In the illustrated example, the example query result message 324 includes the SIP URI for the destination device (e.g. such as "sip:+19725551234@ims.uverse.att.net") found in the NAPTR record(s) indexed by the destination device's E.164 FQDN.

In response to receiving the query result message 324 from the ENUM server 155, the example first S-CSCF 135 next sends a mapping query message 328 to the example DNS server 160 to obtain one or more numeric IP addresses associated with the destination device (i.e., the example user device 110). The mapping query message 328 includes the SIP URI for the example user device 110 (e.g., such as "sip:+19725551234@ims.uverse.att.net") obtained from the received query result message 324 as the address of the destination device for the call. In the illustrated example, the example DNS server 160 uses the SIP URI from the mapping query message 328 to look up (e.g., resolve) the provided SIP URI into a corresponding numeric IP address (e.g., such as "sip:+19725551234@144.60.54.10") for the destination device. After resolving the SIP URI provided in the received mapping query message 328, the example DNS server 160 returns the corresponding numeric IP address ("sip:+19725551234@144.60.54.10") in a query result message 332 sent back to the example first S-CSCF 135.

As discussed above in connection with FIG. 2, the hostname referred to in the SIP URI returned in the query result message 324 (e.g., such as "ims.uverse.att.net"), as well as the corresponding numeric IP address returned in the query result message 332 (e.g., such as "144.60.54.10") are associated with the example second I-CSCF 150 which is configured to receive incoming call requests for the home network of the example user device 110 (i.e., the destination device of the call being established by the example user device 105). Therefore, in response to receiving the query result message 332, the example first S-CSCF 135 is able to use the returned numeric IP address to send another SIP INVITE message 336 to the example second I-CSCF 150. For example, as discussed above in connection with FIG. 2, the example first S-CSCF 135 may encapsulate the INVITE being routed for the example user device 105 in a TCP/UDP message addressed to the second I-CSCF 150 using the numeric IP address (e.g., such as "sip:+19725551234@144.60.54.10") provided in the query result message 332. The example second I-CSCF 150 then processes the received SIP INVITE message 336 to continue establishing the call with the destination user device (i.e., the user device 110).

Figure 4:
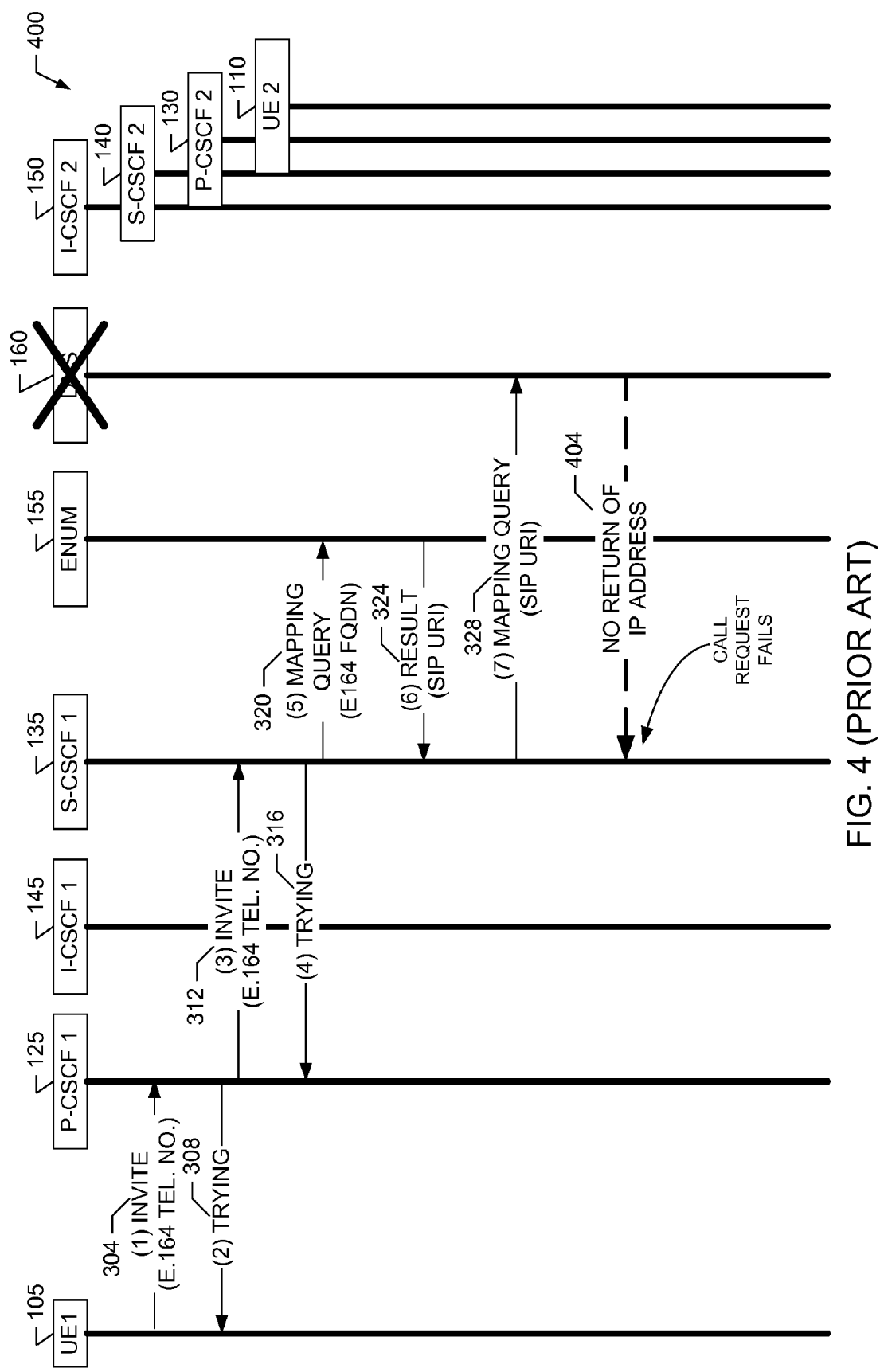
FIG. 4 is a message sequence diagram illustrating an example call setup failure that may occur using the example prior art call setup procedure of FIG. 3.

A message sequence diagram 400 illustrating an example call setup failure that may occur using the example prior art call setup procedure depicted in FIG. 3 is shown in FIG. 4. The example prior art message sequence diagram 400 of FIG. 4 includes many messaging elements in common with the example prior art message sequence diagram 300 of FIG. 3. As such, like messaging elements in FIGS. 3 and 4 are labeled with the same reference numerals. For brevity, the detailed descriptions of these like messaging elements are provided above in connection with the discussion of FIG. 3 and, therefore, are not repeated in the discussion of FIG. 4.

Turning to the example prior message sequence diagram 400 of FIG. 4, the SIP INVITE message 304, the SIP TRYING status message 308, the SIP INVITE message 312, the SIP TRYING status message 316, the mapping query message 320, the query result message 324 and the mapping query message 328 occur in a manner similar to the example prior art message sequence diagram 300 of FIG. 3. However, unlike the illustrated example of FIG. 3, the example DNS server 160 is unavailable in the example prior art message sequence diagram 400 of FIG. 4. The DNS server 160 may be unavailable for any number of reasons, such as, for example, a network failure causing the DNS server 160 to be unreachable, a power failure, a hardware failure and/or a software failure causing the DNS server 160 to be wholly or partially inoperative, etc.

Because the DNS server 160 is unavailable in the illustrated example of FIG. 4, the mapping query message 328 sent by the example first S-CSCF 135 is not received by the example DNS server 160. Moreover, the example DNS server 160 is not available to provide a mapping of the SIP URI of the destination device (i.e., the example user device 110) to a corresponding numeric IP address(es). As a result, after a timeout period expires, the example first S-CSCF 135 determines that a query result message (e.g., such as the query result message 332) was not returned by the DNS server 160. (The lack of a returned query result message is indicated by the dashed directional line 404 of FIG. 4 labeled "No return of IP address.") The unavailability of the DNS server 160 in the example prior art message sequence diagram 400, therefore, results in the example first S-CSCF 135 not being able to obtain the numeric IP address of the example second I-CSCF 150. Without this numeric IP address, the example first S-CSCF 135 is unable to route the INVITE to the example second I-CSCF 150 to continue establishing the call between the example user device 105 and the example user device 110. Thus, because the example first S-CSCF 135 is unable to continue routing the INVITE to establish the call, call setup fails and the example first S-CSCF 135 signals a call setup failure to the calling device 105 in any appropriate manner (not shown).

Figure 5:
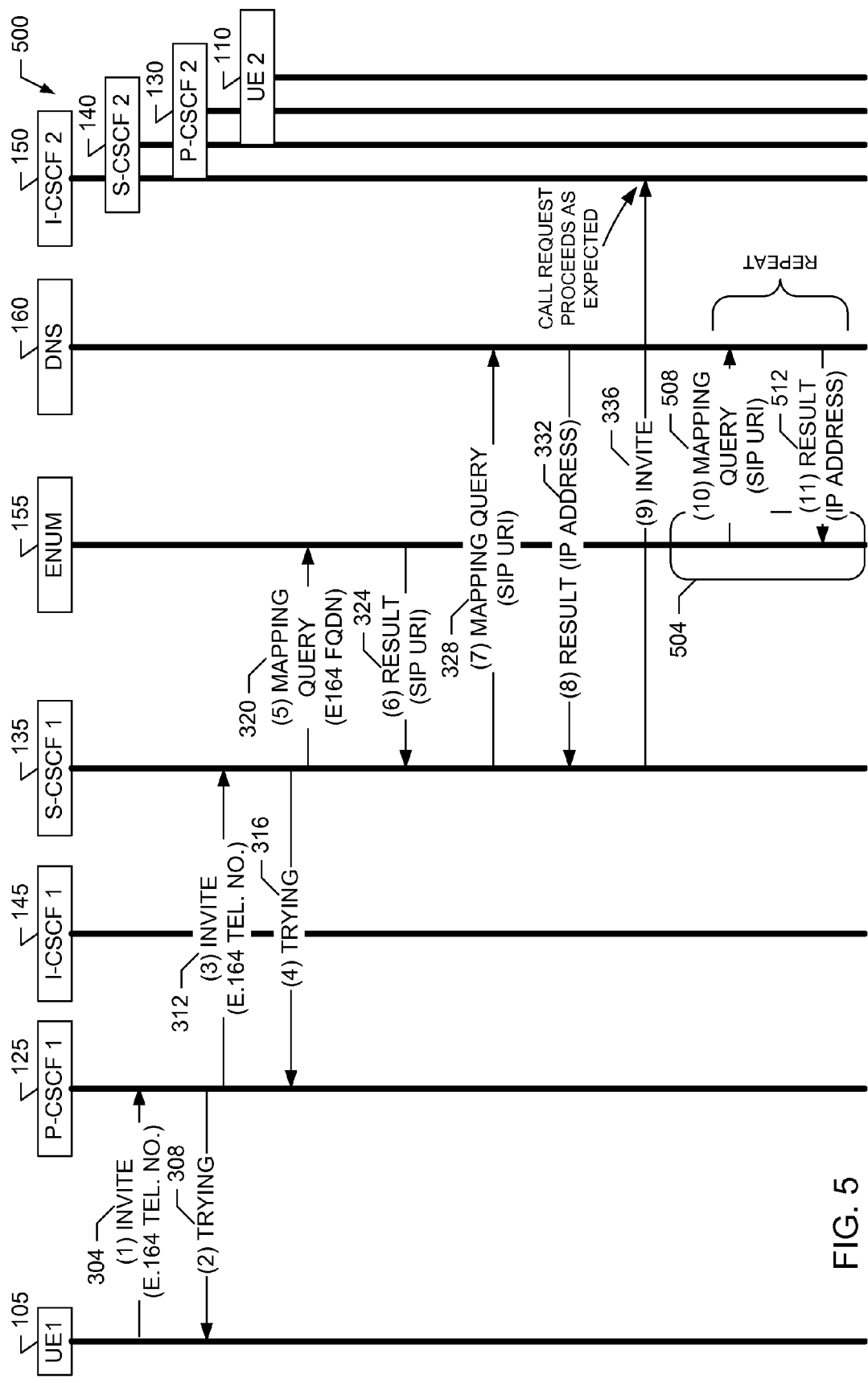
FIG. 5 is a message sequence diagram illustrating an example setup procedure utilizing the methods and/or apparatus disclosed herein to enable call completion in the example IMS communication network of FIG. 1.

A message sequence diagram 500 illustrating an example call setup procedure utilizing the methods and/or apparatus described herein to enable call completion in the example communication network 100 is shown in FIG. 5. The example message sequence diagram 500 of FIG. 5 includes many messaging elements in common with the example message sequence diagrams 300 and 400 of FIGS. 3 and 4, respectively. As such, like messaging elements in FIGS. 3, 4 and 5 are labeled with the same reference numerals. For brevity, the detailed descriptions of these like messaging elements are provided above in connection with the discussion of FIG. 3 and, therefore, are not repeated in the discussion of FIG. 5.

Turning to the example message sequence diagram 500 of FIG. 5, the SIP INVITE message 304, the SIP TRYING status message 308, the SIP INVITE message 312, the SIP TRYING status message 316, the mapping query message 320, the query result message 324, the mapping query message 328, the query result message 332 and SIP INVITE message 336 occur in a manner similar to the example prior art message sequence diagram 300 of FIG. 3. Thus, as in the illustrated example of FIG. 3, in the example message sequence diagram 500 of FIG. 5, the example first S-CSCF 135 obtains the SIP URI for the destination device (i.e., the example user device 110) by querying the example ENUM server 155, and further obtains the numeric IP address for the destination device (which includes the numeric IP address for the example second I-CSCF 150 serving the destination device) by querying the example DNS server 160 using the destination device's SIP URI. In the illustrated example of FIG. 5, the example first S-CSCF 135 is, therefore, able to continue establishing the call by sending the SIP INVITE message 336 to the example second I-CSCF 150 (e.g., by encapsulating the INVITE being routed for the example user device 105 in a TCP/UDP message addressed to the second I-CSCF 150 using its obtained numeric IP address).

Additionally, in the example message sequence diagram 500 of FIG. 5, receipt of the mapping query message 320 sent by the example first S-CSCF 135 causes the example ENUM server 155 to perform an example stored address updating procedure 504. Additionally or alternatively, the example stored address updating procedure 504 may be implemented to be performed continuously, for example, as a background operation, process, etc. As discussed above, the example ENUM server 155 maintains one or more NAPTR records for each network device (e.g., such as each user device 105, 100, etc.) for which E.164 telephone number mapping is required. The example stored address updating procedure 504 is used by the example ENUM server 155 to augment its existing NAPTR records with address information that may be used to enable call completion even in the event that, for example, the DNS server 160 is unavailable. Therefore, the example stored address updating procedure 504, at least in part, allows the call setup failure illustrated in the example prior art message sequence diagram 400 of FIG. 4 to be avoided.

Examining the example stored address updating procedure 504 in greater detail, an example NAPTR record, as described above, is indexed by the E.164 FQDN (which is based on the E.164 telephone number) of the particular network device. The example NAPTR record further includes one or more SIP URIs to enable the E.164 telephone number (and corresponding FQDN) to be mapped to a corresponding SIP URI for routing messages to the particular network device in an IP-based network (e.g., such as the example communication network 100 of FIG. 1). In the context of the example communication network 100, the hostname included in the SIP URI for a particular user device (e.g., such as the example user device 110) is the hostname of the I-CSCF (e.g., such as the example second I-CSCF 150) configured to receive incoming call requests destined for the corresponding user device. As also discussed above, the hostname of the I-CSCF needs to be mapped (e.g., resolved) by a DNS server (e.g., such as the example DNS server 160) into a corresponding numeric IP address to enable messages to be routed to the I-CSCF for establishing a call. In the illustrated example of FIG. 5, the example stored address updating procedure 504 obtains and stores one or more numeric IP addresses in the NAPTR record(s) corresponding to the destination device(s) and associated serving I-CSCFs served by the example ENUM server 155. By storing these numeric IP address(es) in its NAPTR records, the ENUM server 155 can provide the numeric IP address(es) needed to route call setup messages to destination devices and their associated I-CSCFs even in the event that the example DNS server 160 is unavailable.

In particular, in the example message sequence diagram 500 of FIG. 5, receipt of the mapping query message 320 triggers the example stored address updating procedure 504 to send a mapping query message 508 to the example DNS server 160. The mapping query message 508 requests one or more numeric IP addresses associated with the destination device (i.e., the example user device 110) whose SIP URI is included in the mapping query message 508. Similar to the example mapping query message 328, the example DNS server 160 uses the SIP URI from the mapping query message 508 to look up (e.g., resolve) the provided SIP URI (e.g., such as "sip:+19725551234@ims.uverse.att.net") into a corresponding numeric IP address (e.g., such as "sip:+19725551234@144.60.54.10") for the destination device. The example DNS server 160 returns the resolved numeric IP address in a query result message 512 which is sent back to the example ENUM server 155.

Upon receiving the query result message 512, the example stored address updating procedure 504 obtains the numeric IP address(es) included in the query result message 512 and stores the numeric IP address(es) in the NAPTR record corresponding to the destination device (i.e., the example user device 110) addressed in the example mapping query message 328 previously received by the example ENUM server 155. Additionally, the stored address updating procedure 504 then searches for any other NAPTR records corresponding to network devices whose hostname (e.g., corresponding to the address of the example second I-CSCF 150 in this example) is the same as the hostname associated with the numeric IP address returned in the query result message 512. If any such NAPTR records are found, the stored address updating procedure 504 also updates and/or augments these NAPTR record(s) with appropriate numeric IP address(es) for those corresponding network device(s).

For example, if the returned IP address is "sip:+19725551234@144.60.54.10" and corresponds to the SIP URI "sip:+19725551234@ims.uverse.att.net", the hostname "ims.uverse.att.net" and its associated numeric IP address of "144.60.54.10" correspond to the I-CSCF (e.g., example second I-CSCF 150) serving the respective destination device (e.g., the example destination user device 110). In this example, the stored address updating procedure 504 searches for any NAPTR records for devices whose hostname is also "ims.uverse.att.net" or "144.60.54.10." If any such NAPTR records are found, (e.g., such as for a device having a SIP URI of "sip:+19725556789@ims.uverse.att.net" and, thus, also served by the example second I-CSCF 150), the stored address updating procedure 504 updates or augments the found NAPTR record(s) with another numeric IP address for the device using the numeric IP address returned in the query result message 512 (for example, for the device having the SIP URI of "sip:+19725556789@ims.uverse.att.net", the stored address updating procedure 504 may update/augment the device's NAPTR record to include the numeric IP address "sip:+19725556789@144.60.54.10").

Figure 11:
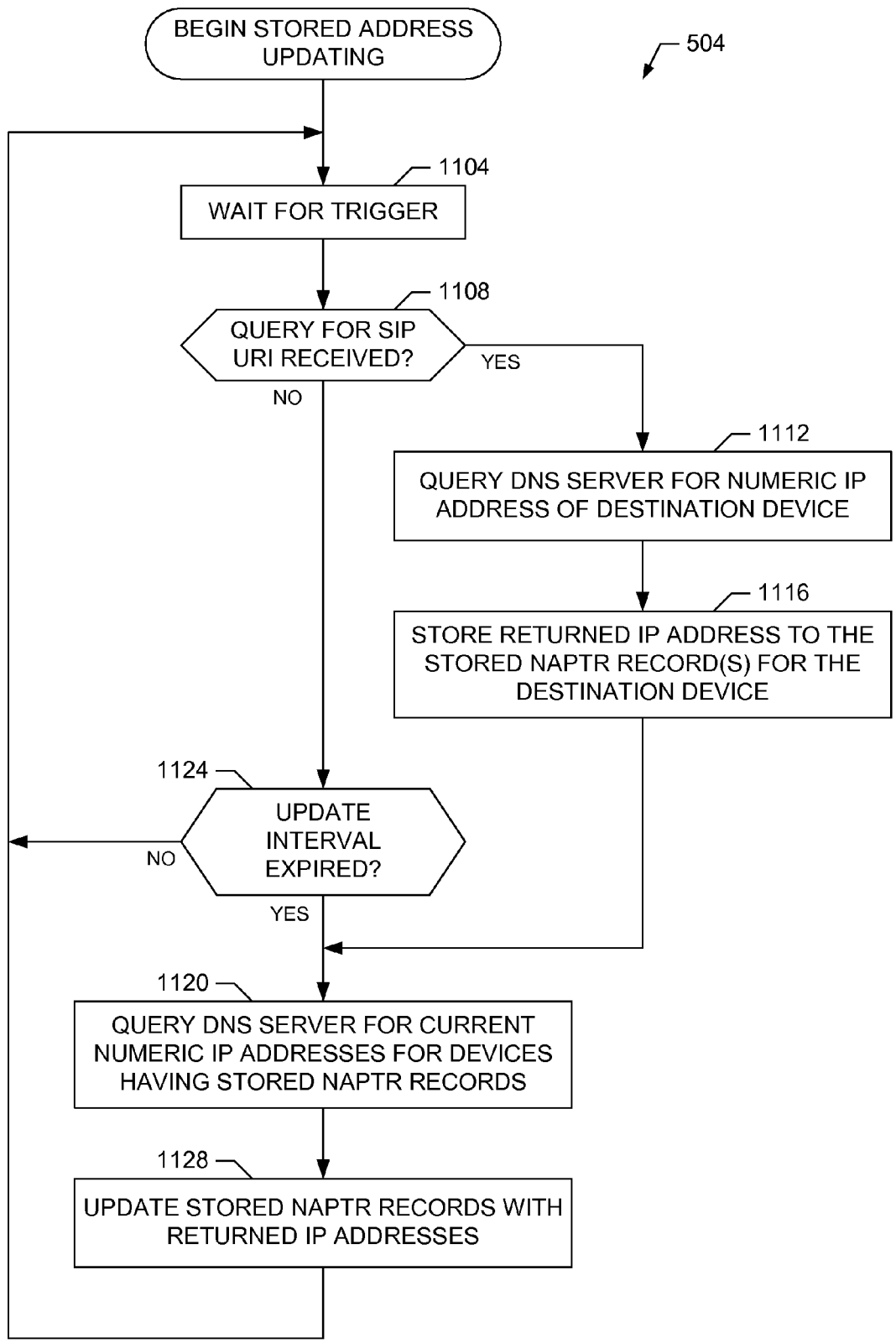
FIG. 11 is a flowchart representative of example machine readable instructions that may be executed to perform a stored address updating procedure to implement the example ENUM server of FIG. 7 and/or the example machine readable instructions of FIG. 10.

Additionally or alternatively, the stored address updating procedure 504 may be configured to operate continuously (e.g., as a background process). In such an implementation, the example stored address updating procedure 504 may cycle through the NAPTR records stored in the example ENUM server 155 and send mapping queries 508 to the example DNS server 160 to obtain the current numeric IP address for each device having a stored NAPTR record. In this way, the example ENUM server 155 is able to maintain NAPTR records updated with recent numeric IP addresses that may be used in the event that the example DNS server 160 becomes unavailable. Example machine readable instructions that may be executed to implement the example stored address updating procedure 504 are shown in FIG. 11 and discussed in greater detail below.

Figure 6:
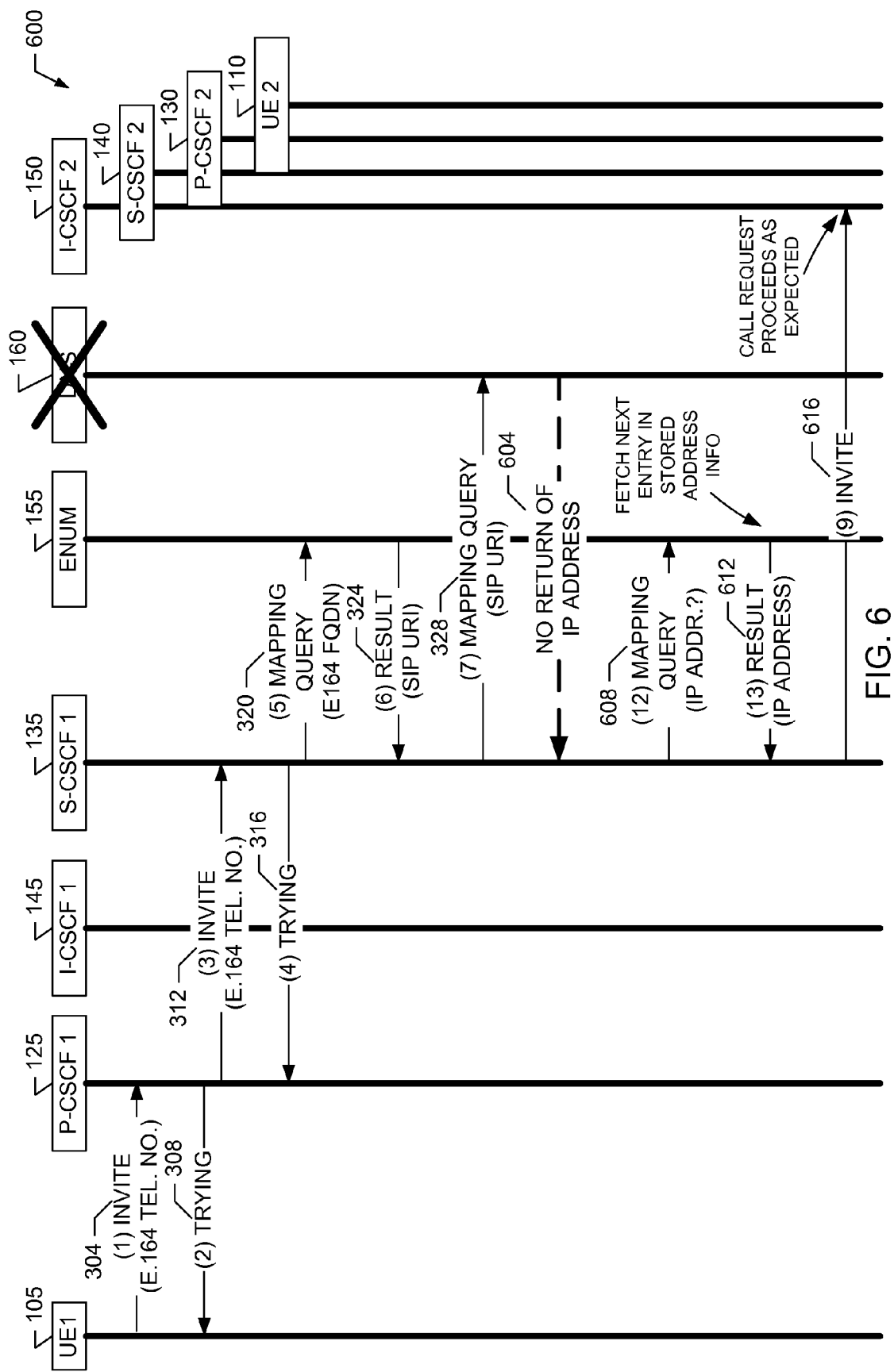
FIG. 6 is a message sequence diagram illustrating how the example call setup failure of FIG. 4 is avoided and call completion is thereby achieved by the example call setup procedure of FIG. 5.

A message sequence diagram 600 illustrating how the example call setup failure depicted in FIG. 4 may be avoided using the call setup procedure enabling call completion depicted in FIG. 5 is shown in FIG. 6. The example message sequence diagram 600 of FIG. 6 includes many messaging elements in common with the example message sequence diagrams 300, 400 and 500 of FIGS. 3, 4 and 5, respectively. As such, like messaging elements in FIGS. 3, 4, 5 and 6 are labeled with the same reference numerals. For brevity, the detailed descriptions of these like messaging elements are provided above in connection with the discussion of FIG. 3 and, therefore, are not repeated in the discussion of FIG. 6.

Turning to the example message sequence diagram 600 of FIG. 6, the SIP INVITE message 304, the SIP TRYING status message 308, the SIP INVITE message 312, the SIP TRYING status message 316, the mapping query message 320, the query result message 324 and the mapping query message 328 occur in a manner similar to the example message sequence diagram 500 of FIG. 5. However, unlike the illustrated example of FIG. 5, and like the illustrated prior art example of FIG. 4, the example DNS server 160 is unavailable in the example message sequence diagram 600 of FIG. 6. For example, the DNS server 160 may be unavailable for any number of reasons, such as, for example, a network failure causing the DNS server 160 to be unreachable, a power failure, a hardware failure and/or a software failure causing the DNS server 160 to be wholly or partially inoperative, etc.

Because the DNS server 160 is unavailable in the illustrated example of FIG. 6, the mapping query message 328 sent by the example first S-CSCF 135 is not received by the example DNS server 160. Moreover, the example DNS server 160 is not available to provide a mapping of the SIP URI of the destination device (i.e., the example user device 110) to a corresponding numeric IP address(es). As a result, after a timeout period expires, the example first S-CSCF 135 determines that a query result message (e.g., such as the query result message 332) was not returned by the DNS server 160. (The lack of a returned query result message is indicated by the dashed directional line 604 of FIG. 6 labeled "No return of IP address.") However, unlike the illustrated prior art example of FIG. 4, the call may continue to be established even when the example DNS server 160 is unavailable in the example message sequence diagram of FIG. 6.

In particular, instead of indicating a call setup failure after determining that a query result message (e.g., such as the query result message 332) was not returned by the DNS server 160 in response to the mapping query message 332, the example first S-CSCF 135 sends a replacement mapping query message 608 to the example ENUM server 155. However, instead of requesting a SIP URI for the example destination user device 110, the replacement mapping query message 608 requests that one or more numeric IP addresses for the example destination user device 110 be returned. In response to receiving the replacement mapping query message 608, the example ENUM server 155 finds the NAPTR record(s) corresponding to the example destination user device 110 (e.g., based on the address information provided in the mapping query message 608). The example ENUM server 155 then determines whether a numeric IP address is included in the found NAPTR record(s). (For example, the stored address updating procedure 504 of FIG. 5 discussed above may have previously been used to obtain and store numeric IP addresses in NAPTR records maintained by the example ENUM server 155.)

Assuming that the example ENUM server 155 finds a numeric IP address in the NAPTR record(s) for the example destination user device 110, the example ENUM server 155 returns the found numeric IP address to the example first S-CSCF 135 in a query result message 612. In an example implementation, the example ENUM server 155 (e.g., via the example stored address updating procedure 504) stores the numeric IP addresses in each NAPTR record in chronological order. By storing the numeric IP addresses in chronological order, the example ENUM server 155 may return the most recent/updated numeric IP address of, for example, the destination user device 110 (which includes the most recent numeric IP address for the example second I-CSCF 150) in the query result message 612. This ability to return numeric IP addresses in chronological order is especially helpful in example network implementations in which IP addresses are assigned to network devices dynamically. In such implementations, the example ENUM server 155 is able to provide the numeric IP address(es) for the example destination user device 110 (and by inclusion the numeric IP address(es) for the example second I-CSCF 150) beginning with the most recent stored address and continuing to provide older addresses, if requested. For example, older addresses may prove successful in establishing a call in network implementations in which a finite block of IP addresses are re-used through dynamic assignment to network devices on an as-needed basis.

Returning to the example message sequence diagram 600 of FIG. 6, in response to receiving the query result message 612 from the example ENUM server 155, the example first S-CSCF 135 is able to use the returned numeric IP address to send a SIP INVITE message 616 to the example second I-CSCF 150. For example, as discussed above in connection with FIG. 2, the example first S-CSCF 135 may encapsulate the INVITE being routed for the example user device 105 in a TCP/UDP message addressed to the second I-CSCF 150 using the numeric IP address provided in the query result message 612. The example second I-CSCF 150 then processes the received SIP INVITE message 612 to continue establishing the call with the destination user device (i.e., the user device 110), even though the example DNS server 160 is unavailable.

A block diagram illustrating an example implementation of the example ENUM server 155 of FIG. 1 is shown in FIG. 7. The example ENUM server 155 of FIG. 7 includes a storage device 705 to store NAPTR records 710 for each network device (e.g., such as each user device 105, 100, etc.) for which the ENUM server 155 is configured to perform E.164 telephone number mapping. The example ENUM server 155 of FIG. 7 further includes a communication interface 715 to receive mapping query messages from external network devices (e.g., such as the example first S-CSCF 135, the example second S-CSCF 140, etc.) and to send corresponding query result messages back to the querying network device. Additionally, the example communication interface 715 is configured to send mapping query messages to and receive corresponding query result messages from one or more DNS servers (e.g., such as the example DNS server 160). The mapping query messages and corresponding query result messages are used by a stored address updater 720 to update and/or augment the NAPTR records 710 stored in the example storage device 705 with numeric IP address(es) for the respective network devices associated with the NAPTR records 710.

In an example implementation, the stored address updater 720 is configured to send a mapping query message to the example DNS server 160 sometime after a corresponding mapping query message was received via the communication interface 715 from an external network device (e.g., such as the example first S-CSCF 135). The mapping query message sent to the example DNS sever 160 by the stored address updater 720 requests a current numeric IP address for the network device referenced by the previously received mapping query message. The requested numeric IP address returned by the example DNS server 160 is subsequently received by the stored address updater 720 via the communication interface 715. The example stored address updater 720 then uses the returned IP address to update and/or augment the existing NAPTR record for the corresponding network device.

For example, assuming that the depicted NAPTR record 710 corresponds to the example user device 110, the NAPTR record 710 typically has an entry 725 including the SIP URI (e.g., such as "sip:+19725551234@ims.uverse.att.net") for the example user device 110. In the illustrated example, after receiving a mapping query message referencing the example user device 110, the example stored address updater 720 sends a corresponding mapping query message to the example DNS server 160 to obtain the numeric IP address for the user device 110. The example DNS server 160 returns the current numeric IP address (e.g., such as "sip:+19725551234@144.60.54.10") for the example user device 110. The returned address is used by the example stored address updater 720 to add the entry 730 to the NAPTR record 710 for the example user device 110.

In the same or another example implementation, the example stored address updater 720 is configured to periodically or aperiodically (and/or at predetermined times and/or intervals, etc.) send mapping query messages to, and receive corresponding query result messages from, the example DNS server 160 to update/augment the stored NAPTR records with corresponding numeric IP address information. For example, the stored address updater 720 may cycle through the stored NAPTR records 710 in any defined order and send a corresponding mapping query message to, and receive a corresponding query result message from, the example DNS server 160 for each stored NAPTR record 710. The numeric IP address(es) returned by the example DNS server 160 are used by the example stored address updater 720 to update the appropriate stored NAPTR record(s) 710, thereby allowing the stored NAPTR records 710 to be updated on a continuous or substantially continuous basis. Additionally, for each requested numeric IP address received from the example DNS server 160, the example stored address updater 720 may search through the stored NAPTR records 710 for devices having the same hostname as the returned numeric IP address and update those found NAPTR records 710.

For example, the depicted NAPTR record 710 corresponding to the example destination user device 110 also includes entries 735 and 740 for storing additional numeric IP addresses associated with the example destination user device 110. In the illustrated example, the additional entries 735 and 740 were obtained by the example stored address updater 720 previously during, for example, an earlier update of the NAPTR records stored in the example storage device 705. The different numeric IP addresses included in the entries 730-740 indicate that the example second I-CSCF 150 serving the example destination user device 110 has its numeric IP address dynamically assigned. In particular, the entries 730-740 indicate that the most recent stored numeric IP address for the example second I-CSCF 150 is "144.60.54.10," the next most recent stored numeric IP address is "144.60.54.12," and the oldest stored numeric IP address for the example second I-CSCF 150 is "144.60.54.14." The chronological order of the numeric IP addresses is reflected by a preference field 745 included in each entry 730-740. In the illustrated example, a lower value in the preference field 745 indicates a more recent numeric IP address. Thus, in an example implementation, the preference fields 745 (and/or an order fields 748) are updated, if appropriate, each time a new numeric IP address is obtained to maintain the chronological order in which the stored addresses are to be returned in response to received mapping query messages.

The example ENUM server 155 of FIG. 7 also includes a stored address retriever 750. The example stored address retriever 750 processes mapping query messages received via the communication interface 715 that request a numeric IP address for a particular network device instead (as opposed to a request for a SIP URI). When a mapping query message requesting a numeric IP address is received, the example stored address retriever 750 searches the example storage device 705 for the NAPTR record(s) 710 corresponding to the network device referenced in the received mapping query message. The example stored address retriever 750 then obtains an appropriate numeric IP address from the found NAPTR record (if available) and returns the numeric IP address in a query result message sent via the communication interface 715.

For example, the appropriate numeric IP address obtained by the example stored address retriever 750 may correspond to the most recent stored numeric IP address included in the found NAPTR record (e.g., such as the numeric IP address in the entry 730 of the depicted example NAPTR record 710). Additionally or alternatively, the received mapping query message may specify a desired numeric IP address to be retrieved by the example stored address retriever 750. For example, the received mapping query may specify a preference value corresponding to the NAPTR record preference fields 745 to indicate the appropriate numeric IP address to be returned. The use of a preference value, or similar chronological indicator, allows the example stored address retriever 750 to, for example, cycle through the stored numeric IP addresses in a desired (e.g., reverse) chronological order to provide subsequent numeric IP addresses if a call setup based on a previously provided numeric IP address is unsuccessful. For example, the example stored address retriever 750 could step through the entries 730-740 of the depicted example NAPTR record 710 autonomously and/or based on preference value(s), or similar chronological indicator(s), provided in the received mapping query message.

A block diagram illustrating an example implementation of the example first S-CSCF 135 of FIG. 1 is shown in FIG. 8. Additionally or alternatively, the block diagram of FIG. 8 could illustrate an example implementation of the example second example S-CSCF 140. Without loss of generality, for ease of discussion the description of FIG. 8 that follows will refer to the example first S-CSCF 135. The example first S-CSCF 135 of FIG. 8 includes a SIP query processor 805 to query an ENUM server (e.g., such as the example ENUM server 155) to obtain one or more SIP URIs associated with a destination device with which a call is to be established. In an example implementation, the SIP query processor 805 sends a query including the destination device's E.164 FQDN to, for example, the ENUM server 155. The example ENUM server 155, in turn, uses the provided E.164 FQDN to return the SIP URI of the destination device. The SIP URI received by the SIP query processor 805 from the ENUM server 155 may then be used to query a DNS server to obtain a numeric IP address of the destination device as discussed above.

The example first S-CSCF 135 also includes an IP query processor 810 to query an ENUM server (e.g., such as the example ENUM server 155) in the event that a previous query by the example first S-CSCF 135 to a DNS server (e.g., such as the example DNS server 160) fails. The example IP query processor 810 allows the example first S-CSCF 135 to attempt to obtain a numeric IP address for a destination device for which a call is being established when the DNS server is unavailable and/or does not respond to a mapping query message.

In particular, after the example first S-CSCF 135 determines that a query result message corresponding to a previously sent mapping query message was not received from, for example, the DNS server 160, the example IP query processor 810 sends a subsequent mapping query message to, for example, the ENUM server 155 of FIG. 7. The subsequent mapping query message requests a numeric IP address for the destination device (e.g., such as the example user device 110) for which a call is being established. The example ENUM server 155 processes the mapping query message and returns an appropriate numeric IP address for the destination device if such a numeric IP address is stored in the destination device's NAPTR record(s). If a numeric IP address is returned by the example ENUM server 155, the example IP query processor 810 receives the returned IP address and provides it to the example first S-CSCF 135 to enable the call with the destination device to be completed.

In an example implementation, the IP query processor 810 is further configured to send additional subsequent mapping query messages to the example ENUM server 155 if call setup is unsuccessful using a numeric IP address previously returned by the example ENUM server 155 in response to a corresponding previous mapping query message from the IP query processor 810. For example, the IP query processor 810 may keep track of the number of call setup attempts and the corresponding number of numeric IP addresses obtained from the example ENUM server 155. The example IP query processor 810 may then use this tracked information to request an appropriate numeric IP address for the destination device from the example ENUM server 155. For example, upon initially detecting that the example DNS server 160 is unavailable, the example IP query processor 810 may first query the ENUM server 155 for the most recent stored numeric IP address for the destination device. If call setup fails with the most recent stored numeric IP address, the example IP query processor 810 may subsequently request the next most recent stored numeric IP address for the destination device. This procedure may repeat until call setup is successful or the available stored numeric IP addresses for the destination device are exhausted.

Figure 9:
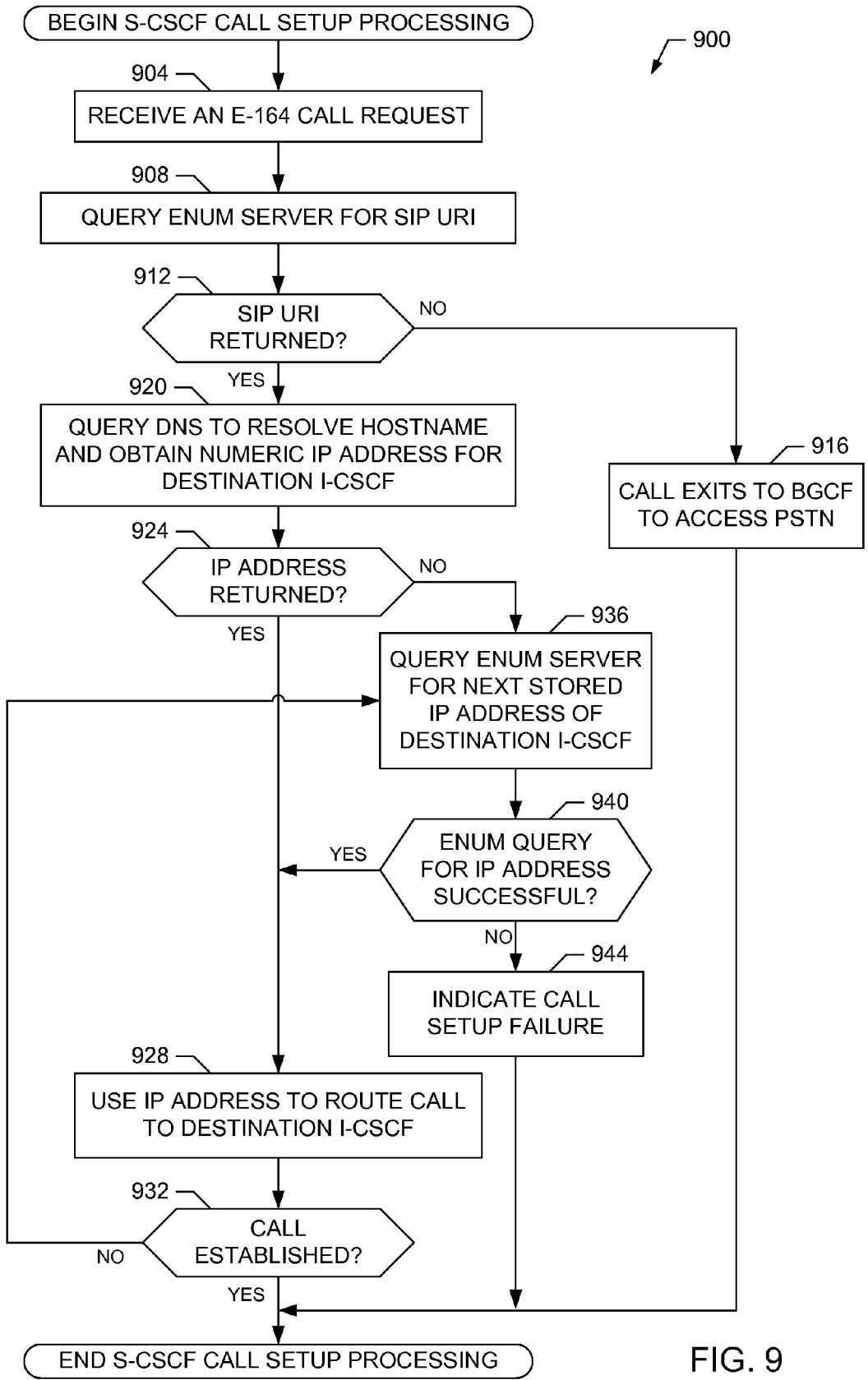
FIG. 9 is a flowchart representative of example machine readable instructions that may be executed to implement call setup processing in the example call processor of FIG. 8 to enable call completion in the example IMS communication network of FIG. 1.
Figure 10:
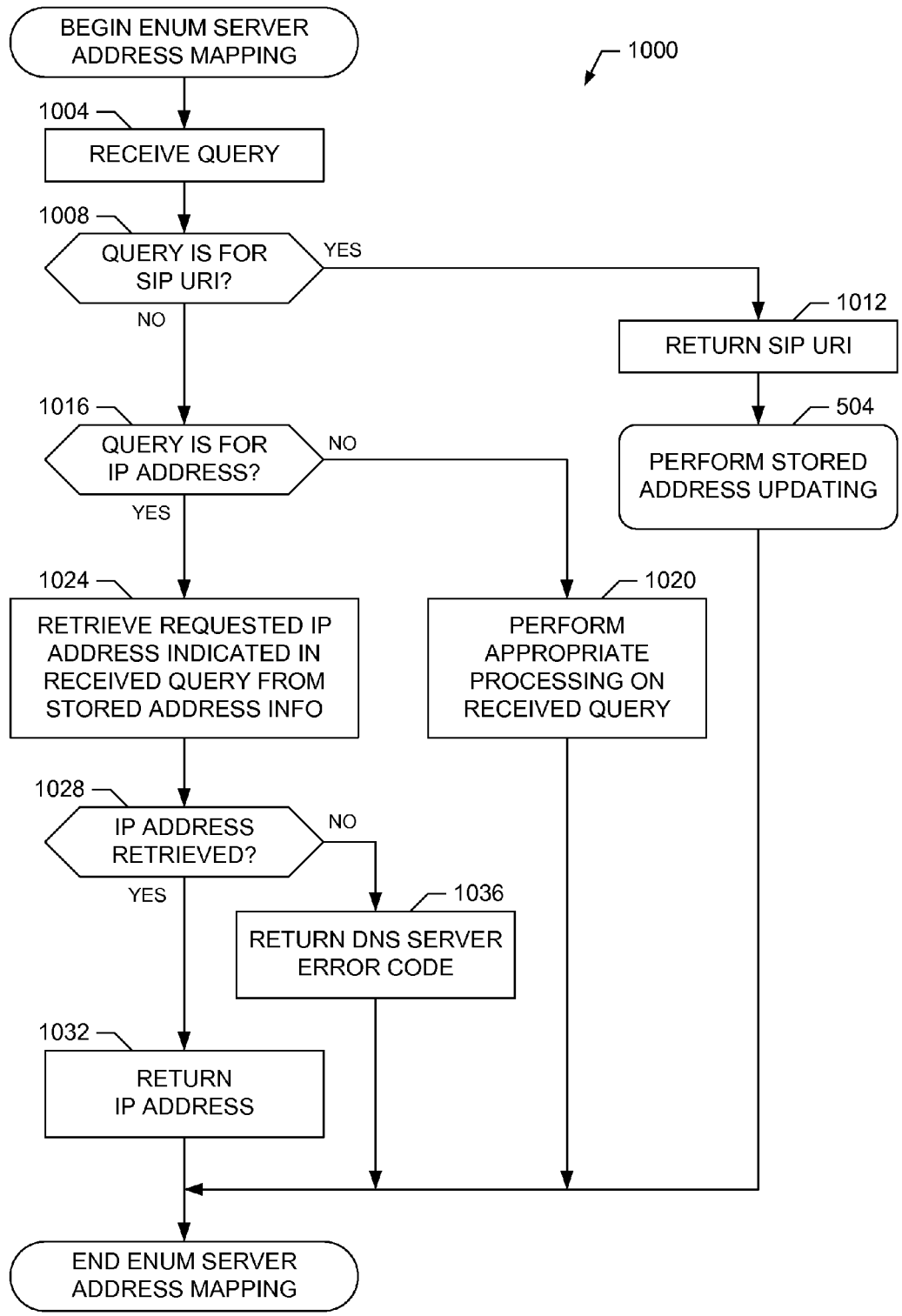
FIG. 10 is a flowchart representative of example machine readable instructions that may be executed to implement address mapping in the example ENUM server of FIG. 7 to enable call completion in the example IMS communication network of FIG. 1

Flowcharts representative of example machine readable instructions that may be executed to implement, at least in part, the example communication network 100, the example first S-CSCF 135, the example second S-CSCF 140, the example first I-CSCF 145, the example second I-CSCF 150, the example ENUM server 155, the example DNS server 160, the example search tables procedure 220, the example search tables procedure 235, the example stored address updating procedure 504, the example communication interface 715, the example stored address updater 720, the example stored address retriever 750 and/or the example IP query processor 810 are shown in FIGS. 9-11. In these examples, the machine readable instructions represented by each flowchart may comprise one or more programs for execution by: (a) a processor, such as the processor 1212 shown in the example computer 1200 discussed below in connection with FIG. 12, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1212, but the entire program or programs and/or portions thereof could alternatively be executed by a device other than the processor 1212 and/or embodied in firmware or dedicated hardware (e.g., implemented by an Application Specific Integrated Circuit (ASIC), a Programmable Logic Device (PLD), a Field Programmable Logic Device (FPLD), discrete logic, etc.). For example, any or all of the example communication network 100, the example first S-CSCF 135, the example second S-CSCF 140, the example first I-CSCF 145, the example second I-CSCF 150, the example ENUM server 155, the example DNS server 160, the example search tables procedure 220, the example search tables procedure 235, the example stored address updating procedure 504, the example communication interface 715, the example stored address updater 720, the example stored address retriever 750 and/or the example IP query processor 810 could be implemented by any combination of software, hardware, and/or firmware. Also, some or all of the machine readable instructions represented by the flowchart of FIGS. 9-11 may be implemented manually. Further, although the example machine readable instructions are described with reference to the flowcharts illustrated in FIGS. 9-11, many other techniques for implementing the example methods and apparatus described herein may alternatively be used. For example, with reference to the flowcharts illustrated in FIGS. 9-11, the order of execution of the blocks may be changed, and/or some of the blocks described may be changed, eliminated, combined and/or subdivided into multiple blocks.

Example machine readable instructions 900 that may be executed to implement call setup processing to enable call completion in the example communication network 100 are shown in FIG. 9. Without loss of generality, and for ease of discussion, the following description of the example machine readable instructions 900 refers to the example first S-CSCF 135 as the place of execution. However, the instructions may alternatively be executed by the example second S-CSCF 140 of FIG. 1 and/or the example IP query processor 810 of FIG. 8.

The example machine readable instructions 900 may be executed, for example, when an incoming call setup request (e.g., such as a SIP INVITE) is received by the example first S-CSCF 135. The example machine readable instructions 900 begin execution at block 904 at which the example first S-CSCF 135 receives a call setup request from, for example, the example user device 105. The received call setup request includes the E.164 telephone number for the call's destination device, which in the illustrated example is the example user device 110. For example, the call setup request received at block 904 may correspond to a SIP INVITE message including the E.164 telephone number for the example destination user device 110.

Next, control proceeds to block 908 at which the example first S-CSCF 135 queries the example ENUM server 155 for a SIP URI corresponding to the example destination user device 110. For example, at block 908 the example first S-CSCF 135 may send a mapping query message to the example ENUM server 155 that includes the E.164 telephone number and/or FQDN for the example destination user device 110. Next, at block 912 the example first S-CSCF 135 determines whether the requested SIP URI was received from the example ENUM server 155 in response to the query made at block 908. If the requested SIP URI was not returned (block 912), the destination device is not an IP-based device and, thus, control proceeds to block 916. At block 916, the example first S-CSCF 135 calls an appropriate Breakout Gateway Control Function (BGCF) to access the Public Switched Telephone Network (PSTN) to continue establishing the call with the destination device. Execution of the example machine readable instructions 900 then ends.

However, if the requested SIP URI was returned (block 912), control proceeds to block 920 at which the example first S-CSCF 135 queries the example DNS server 160 to resolve the hostname of the returned SIP URI into a corresponding numeric IP address for the example second I-CSCF 150 serving the example destination user device 110. For example, at block 920 the example first S-CSCF 135 may send a mapping query message to the example DNS server 160 that includes the SIP URI for the example destination user device 110 obtained in response to the query at block 910. The SIP URI provided by the example first S-CSCF 135 in its mapping query message is used by the example DNS server 160 to search its stored NAPTR records and return the appropriate numeric IP address for the example destination user device 110. As discussed above, the hostname included in the SIP URI obtained in response to the query at block 908 and the associated numeric IP address obtained in response to the query at block 920 correspond to the second example I-CSCF 150 serving the user device 110. Thus, by obtaining the numeric IP address for the example destination user device 110, the example first S-CSCF 135 also obtains the numeric IP address for the example second I-CSCF 150.

Next, at block 924 the example first S-CSCF 135 determines whether the requested numeric IP address was received from the example DNS server 160 in response to the query made at block 920. If the requested numeric IP address was returned (block 924), control proceeds to block 928 at which the example first S-CSCF 135 uses the returned numeric IP address to route the call setup request to the second example I-CSCF 150 serving the example destination user device 110. For example, at block 928 the example first S-CSCF 135 may encapsulate the call setup request (e.g., such as the SIP INVITE) being routed to the example destination user device 110 in a TCP/UDP message addressed to the second I-CSCF 150 using the numeric IP address returned by the example DNS server 160 in response to the query made at block 920.

Control then proceeds to block 932 at which the example first S-CSCF 135 determines whether the call was established by routing the call setup request to the example second I-CSCF 150 via the processing at block 928. If the call with the example destination user device 110 was established (block 932), execution of the example machine readable instructions 900 then ends. If, however, the call was not successfully established (block 932), or if the numeric IP address was not returned by the example DNS server 160 (e.g., because the DNS server 160 was unavailable, etc.) (block 924), control proceeds to block 936.

Irrespective of whether control reaches block 936 directly from block 924 (i.e., no IP address returned) or via block 932, at block 936 the example first S-CSCF 135 queries the example ENUM server 155 for an appropriate numeric IP address for the example second I-CSCF 150 serving the example destination user device 110. The example ENUM server 155 described herein is able to service such a request because the NAPTR records stored by the example ENUM server 155 include numeric IP addresses in addition to SIP URI(s) and other address information. For example, at block 936 the example first S-CSCF 135 may send a mapping query message to the example ENUM server 155 requesting a numeric IP address for the example destination user device 110. As discussed above, the hostname included in the SIP URI obtained in response to the query at block 908 and the associated numeric IP address obtained in response to the query at block 920 correspond to the second example I-CSCF 150 serving the user device 110. Thus, by obtaining the numeric IP address for the example destination user device 110, the example first S-CSCF 135 also obtains the numeric IP address for the example second I-CSCF 150.

Additionally, the query to the example ENUM server 155 made at block 936 may include a preference value or other chronological indicator to request a particular numeric IP address for the example second I-CSCF 150, or equivalently, the example destination user device 110. For example, and as discussed above, the example ENUM server 155 may store multiple numeric IP addresses in the NAPTR record for a particular network device. These multiple numeric IP addresses may be stored in chronological order or in some other preferential ordering. In such an implementation, the example first S-CSCF 135 may request a particular one of the multiple stored numeric IP addresses for a particular network device. For example, if block 936 is reached during the first processing iteration of the example machine readable instructions 900, the example first S-CSCF 135 may request the most recently stored numeric IP address for the example destination user device 110. If call setup fails with this most recent stored numeric IP address, during the next iteration the example first S-CSCF 135 may request the next most recent stored numeric IP address for the example destination user device 110. In the event of another call setup failure, this iterative procedure may be repeated until the call setup is successful or all of the multiple stored numeric IP address have been retrieved without a call setup success.

Next, control proceeds to block 940 at which the example first S-CSCF 135 determines whether the requested numeric IP address was received from the example ENUM server 155. If the requested numeric IP address was received (block 940), control proceeds to block 928 and blocks subsequent thereto at which the example first S-CSCF 135 attempts to continue establishing the call using the numeric IP address received in response to the query at block 936. However, if the requested numeric IP address was not received (block 940), control proceeds to block 944 at which the example first S-CSCF 135 indicates a call setup failure because, without the numeric IP address for the example second I-CSCF 150, the example first S-CSCF 135 is unable to continue routing the call setup request. Execution of the example machine readable instructions 900 then ends.

Example machine readable instructions 1000 that may be executed to implement address mapping for the example ENUM server 155 and/or the example stored address retriever 750 of FIG. 7 to enable call completion in the example communication network 100 are shown in FIG. 10. The example machine readable instructions 1000 may be executed, for example, when an incoming query (e.g., such as a mapping query message) is received by the example ENUM server 155. The example machine readable instructions 1000 begin execution at block 1004 at which the example ENUM server 155 receives a query via the example communication interface 715. Next, at block 1008 the example ENUM server 155 determines whether the query is for a SIP URI of a network device. For example, a query for a SIP URI may take the form of a mapping query message including an E.164 telephone number and/or FQDN for a destination device (e.g., such as the example user device 110) for which a SIP URI is requested.

If the received query is for a SIP URI (block 1008), control proceeds to block 1012 at which the example ENUM server 155 returns the requested SIP URI corresponding to the received query (assuming it is available). For example, at block 1012 the example ENUM server 155 may search its stored NAPTR records for the record corresponding to the E.164 telephone number and/or FQDN included in the mapping query message received at block 1004. The example ENUM server 155 then returns the SIP URI(s) (e.g., such as in a list form) to the originator of the query received at block 1004. Control then proceeds to block 504 at which the example ENUM server 155 performs the stored address updating procedure 504 discussed above in connection with FIG. 5 to update and/or augment the stored NAPTR records with numeric IP address information. Example machine readable instructions that may be executed to implement the processing at block 504 are shown in FIG. 11 and discussed in greater detail below. After processing at block 504 completes, execution of the example machine readable instructions 1000 ends.

Returning to block 1008, if the received query is not for a SIP URI (block 1008), control proceeds to block 1016 at which the example ENUM server 155 determines whether the query is for a numeric IP address of a network device. For example, a query for a numeric IP address may take the form of a mapping query message including a request for an appropriate numeric IP address for a destination device (e.g., such as the example user device 110). If the received query is not for a numeric IP address (block 1016), control proceeds to block 1020 at which the example ENUM server 155 performs any appropriate processing for a received query that is not requesting either a SIP URI or a numeric IP address. For example, at block 1020 the example ENUM server 155 may perform error/fault processing and indicate an appropriate error/fault condition. After the processing at block 1020 completes, execution of the example machine readable instruction ends.

However, if the received query is for a numeric IP address (block 1016), control proceeds to block 1024 at which the example ENUM server 155 retrieves the numeric IP address indicated in the query received at block 1004. For example, at block 1024 the example stored address retriever 750 included in the example ENUM server 155 may obtain the NAPTR record for the destination device (e.g., such as the example user device 110) whose SIP URI is included in the query received at block 1004. The obtained NAPTR record may include one or more numeric IP addresses for the network device associated with the obtained NAPTR record. Additionally, the one or more numeric IP addresses may be stored in chronological or some other preferential order. In such an implementation, the query received at block 1004 may indicate a preference (e.g., chronological) for which numeric IP address should be returned.

Next, control proceeds to block 1028 at which the example ENUM server 155 determines whether a numeric IP address can be retrieved. For example, a numeric IP address may not be retrievable, for example, if the NAPTR record for the destination device referenced in the received query does not exist, if there are no numeric IP addresses stored in the NAPTR record for the referenced destination device, etc. If the requested numeric IP address is indeed retrieved (block 1028), control proceeds to block 1032 at which the example ENUM server 155 returns the requested numeric IP address (e.g., via a query result message sent via the example communication interface 715) to the originator or the query received at block 1004. If, however, the requested numeric IP address is not retrieved (block 1028), control proceeds to block 1036 at which the example ENUM server 155 returns a DNS server error code (e.g., sent via the example communication interface 715) indicating that the requested numeric IP address is not available. After processing at block 1032 or 1036 completes, execution of the example machine readable instructions 1000 ends.

Example machine readable instructions 504 that may be executed to implement: (a) stored address updating for the example ENUM server 155, (b) the example stored address updating procedure 504 of FIG. 5, (c) the example stored address updater 720 of FIG. 7 and/or (d) the stored address updating process at block 504 of FIG. 10 are illustrated in FIG. 11. The illustrated example machine readable instructions 504 are intended to be executed as a continuous background process, but other equivalent implementations are also possible. The example machine readable instructions 504 begin execution at block 1104 at which the example ENUM server 155 waits for a trigger to initiate stored address updating. In the illustrated example, the two possible triggers are a received query for a destination device's SIP URI and the expiration of an update interval, although the use of other triggers is also possible.

If a query for a destination device's SIP URI is received (block 1108), control proceeds to block 1112 at which the example ENUM server 155 queries the example DNS server 160 for the current numeric IP address for the destination device (e.g., such as the example user device 110) referenced in the received query processed at block 1108. For example, at block 1112 the example stored address updater 720 included in the example ENUM server 155 sends a mapping query message (e.g., via the example communication interface 715) to the example DNS server 160 requesting the destination device's current numeric IP address. Upon receiving the requested numeric IP address from the example DNS server 160 (e.g., via the example communication interface 715), control proceeds to block 1116 at which the example ENUM server 155 updates and/or augments the destination device's stored NAPTR record with the received numeric IP address. For example, the example stored address updater 720 included in the example ENUM server 155 may add the received numeric IP address to the NAPTR record, update an existing entry in the NAPTR record to include the received numeric IP address, reorder the entries in the NAPTR record (e.g., by updating the preference and/or order fields in one or more entries of the NAPTR record) such that one or more numeric IP addresses (e.g., including the currently received numeric IP address) are stored in chronological or some other preferential order, etc. Additionally, at block 1116, the example ENUM server 155 (e.g., via the example stored address updater 720) may update and/or augment other NAPTR records corresponding to network devices whose hostname is the same as the hostname of the received numeric IP address. Then, after processing at block 1116 completes, control proceeds to block 1120.

Returning to block 1108, if a query for a destination device's SIP URI is not received (block 1108), control proceeds to block 1124 at which the example ENUM server 155 determines whether a stored address update interval has expired. If the stored address update interval has not expired (block 1124), control returns to block 1104 at which the example ENUM server 155 continues to wait for a trigger to initiate stored address updating. If, however, the stored address update interval has expired (block 1124), control proceeds to block 1120.

At block 1120, the example ENUM server 155 cycles through its stored NAPTR records and queries the corresponding example DNS server(s) for the current numeric IP addresses for the network devices associated with the stored NAPTR records. For example, at block 1120 the example stored address updater 720 included in the example ENUM server 155 may send mapping queries (e.g., via the example communication interface 715) to the example DNS server 160 to obtain the current numeric IP address for each device having a stored NAPTR record. Upon receiving the requested numeric IP addresses from the example DNS server(s) 160 (e.g., via the example communication interface 715), control proceeds to block 1128 at which the example ENUM server 155 updates and/or augments the stored NAPTR records with the received numeric IP address. For example, at block 1128, for each numeric IP address received from the example DNS server 160 at block 1120, the example stored address updater 720 included in the example ENUM server 155 may update and/or augment each NAPTR record corresponding to a network device whose hostname is the same as the hostname of the received numeric IP address. Then, after processing at block 1128 completes, control returns to block 1104 at which the example ENUM server 155 begins waiting for a trigger to initiate another stored address updating iteration.

Figure 12:
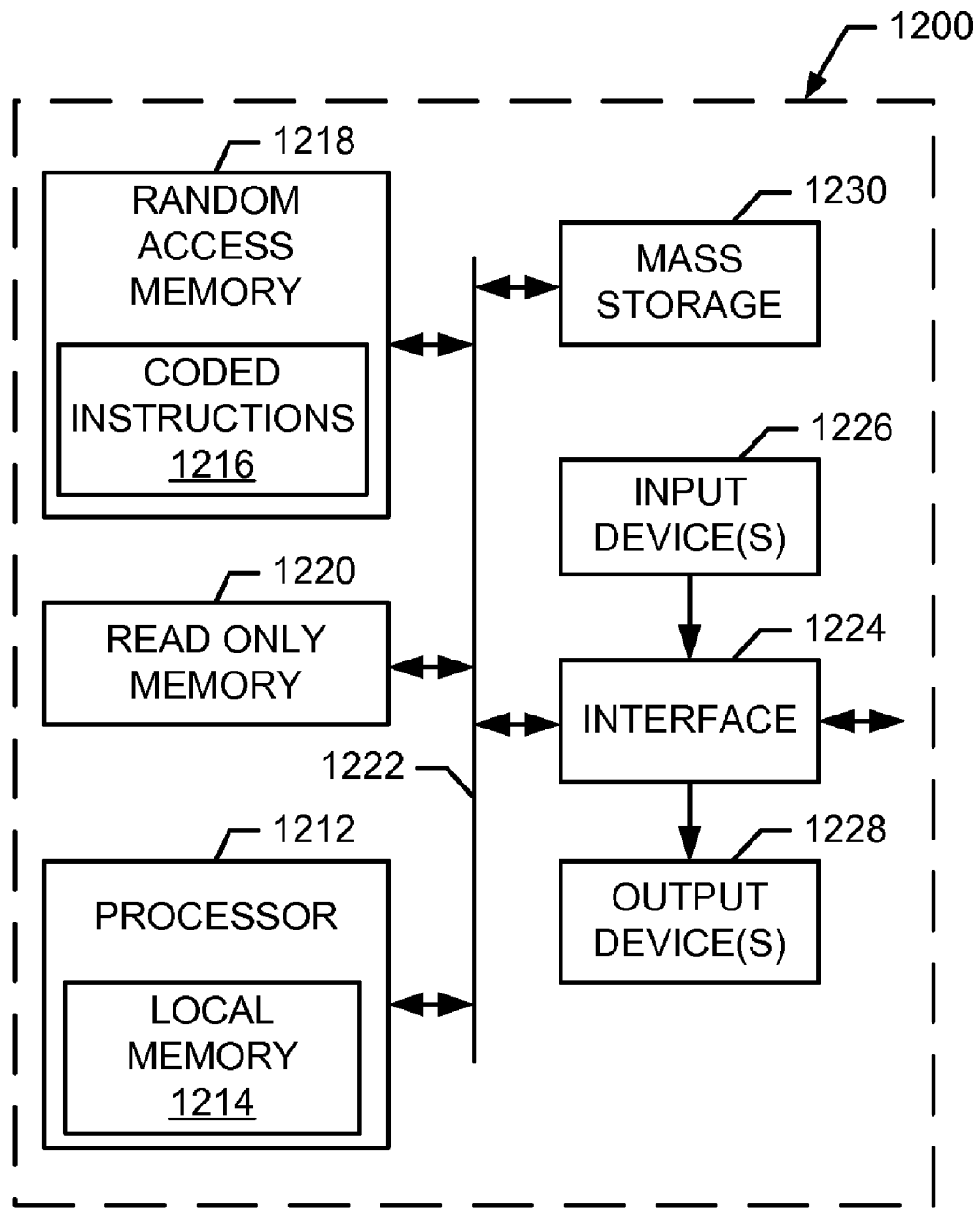
FIG. 12 is a block diagram of an example computer that may execute the example machine readable instructions of FIGS. 9-10 and/or 11 to implement the example ENUM server of FIG. 7, the example call processor of FIG. 8 and/or the example IMS communication network of FIG. 1.

FIG. 12 is a block diagram of an example computer 1200 capable of implementing the apparatus and methods disclosed herein. The computer 1200 can be, for example, a server, a personal computer, a Personal Digital Assistant (PDA), an Internet appliance, a DVD player, a CD player, a digital video recorder, a personal video recorder, a set top box, or any other type of computing device.

The system 1200 of the instant example includes a processor 1212 such as a general purpose programmable processor. The processor 1212 includes a local memory 1214, and executes coded instructions 1216 present in the local memory 1214 and/or in another memory device. The processor 1212 may execute, among other things, the machine readable instructions represented in FIGS. 9-11. The processor 1212 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1212 is in communication with a main memory including a volatile memory 1218 and a non-volatile memory 1220 via a bus 1222. The volatile memory 1218 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1220 may be implemented by flash memory and/or any other desired type of memory device. Access to the main memory 1218, 1220 is typically controlled by a memory controller (not shown).

The computer 1200 also includes an interface circuit 1224. The interface circuit 1224 may be implemented by any type of interface standard, such as an Ethernet interface, a Universal Serial Bus (USB), and/or a 3rd Generation Input/Output (3GIO) interface.

One or more input devices 1226 are connected to the interface circuit 1224. The input device(s) 1226 permit a user to enter data and commands into the processor 1212. The input device(s) can be implemented by, for example, a keyboard, a mouse, a touchscreen, a track-pad, a trackball, an isopoint and/or a voice recognition system.

One or more output devices 1228 are also connected to the interface circuit 1224. The output devices 1228 can be implemented, for example, by display devices (e.g., a liquid crystal display, a Cathode Ray Tube display (CRT)), by a printer and/or by speakers. The interface circuit 1224, thus, typically includes a graphics driver card.

The interface circuit 1224 also includes a communication device such as a modem or network interface card to facilitate exchange of data with external computers via a network (e.g., an Ethernet connection, a Digital Subscriber Line (DSL), a telephone line, coaxial cable, a cellular telephone system, etc.).

The computer 1200 also includes one or more mass storage devices 1230 for storing software and data. Examples of such mass storage devices 1230 include floppy disk drives, hard drive disks, compact disk drives and Digital Versatile Disk (DVD) drives. The mass storage device 1230 may implement the example storage device 705 of FIG. 7. Alternatively, the volatile memory 1218 may implement the example storage device 705.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

This patent contemplate examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of processing a voice over Internet protocol call, the method comprising:
    failing to receive a response from a domain name system server to a request for a first numeric Internet protocol address of a destination device;
    querying a telephone number mapping server for the first numeric Internet protocol address;
    sending an invite message to process the call when the first numeric Internet protocol address is received from the telephone number mapping server; and
    querying, using a processor, the telephone number mapping server for a second numeric Internet protocol address of the destination device when the call fails to be established using the first numeric Internet protocol address.

2. A method as defined in claim 1 further comprising requesting the first numeric Internet protocol address from the domain name system server using a session initiation protocol uniform resource identifier obtained from the telephone number mapping server.

3. A method as defined in claim 1 wherein the telephone number mapping server obtains the first numeric Internet protocol address of the destination device by querying the domain name system server.

4. A method as defined in claim 1 wherein querying the telephone number mapping server for the first numeric Internet protocol address comprises providing a preference value to the telephone number mapping server requesting a particular one or a plurality of numeric Internet protocol addresses associated with the destination device.

5. A method to establish a voice over Internet protocol call with a destination user device in an Internet protocol multimedia subsystem communication network, the method comprising:
    returning a first address of a call processor associated with the destination user device in response to a first query of a telephone number mapping (ENUM) server; and
    returning a numeric Internet protocol address of the call processor in response to a second query of the telephone number mapping server.

6. A method as defined in claim 5 wherein the second query occurs after a failed attempt to obtain the numeric Internet protocol address from a domain name system server using the first address of the call processor previously returned in response to the first query of the telephone number mapping server.

7. A method as defined in claim 5 wherein the first address comprises a hostname of a session initiation protocol uniform resource identifier.

8. A method as defined in claim 5 wherein the numeric Internet protocol address of the call processor comprises a dynamic Internet protocol address.

9. A method as defined in claim 8 further comprising storing in the telephone number mapping server a plurality of numeric Internet protocol addresses of the call processor obtained from a domain name system server using the first address for the call processor.

10. A method as defined in claim 9 wherein the plurality of numeric Internet protocol addresses are stored in chronological order, and returning the numeric Internet protocol address comprises returning a most recent stored numeric Internet protocol address of the call processor.

11. A method as defined in claim 10 wherein each of the plurality of numeric Internet protocol addresses is stored in a respective entry of a naming authority pointer record, and wherein the chronological order of the stored plurality of numeric Internet protocol addresses is maintained using at least one of a preference field or an order field included in each entry of the naming authority pointer record.

12. A method as defined in claim 10 further comprising returning a next most recent stored numeric Internet protocol address of the call processor from the telephone number mapping server in response to a third query occurring after the call fails to be established using the most recent stored Internet protocol address returned by the telephone number mapping server.

13. A method as defined in claim 5 further comprising storing a plurality of numeric Internet protocol addresses for a respective plurality of call processors in the telephone number mapping server, and periodically updating the plurality of numeric Internet protocol addresses by querying a domain name system server at intervals for respective numeric Internet protocol addresses of the plurality of call processors.

14. A method as defined in claim 5 further comprising obtaining the numeric Internet protocol address of the call processor by querying a domain name system server using the first address of the call processor.

15. A telephone number mapping server comprising:
a memory storing machine readable instructions, a session initiation protocol address for a call processor and a numeric Internet protocol address for the call processor; and
a query processor to execute the instructions, the query processor to be responsive to a first query to return the session initiation protocol address and responsive to a second query to return the numeric Internet protocol address.

16. A telephone number mapping server as defined in claim 15 further comprising a stored address processor to execute the instructions to obtain the numeric Internet protocol address for the call processor by querying a domain name system server using the session initiation protocol address for the call processor.

17. A telephone number mapping server as defined in claim 15 wherein the memory is further to store a plurality of numeric Internet protocol addresses of the call processor.

18. A telephone number mapping server as defined in claim 17 wherein each numeric Internet protocol address in the plurality of numeric Internet protocol addresses was dynamically assigned to the call processor, and further comprising a stored address processor to execute the instructions to obtain each numeric Internet protocol address by querying a domain name system server.

19. A telephone number mapping server as defined in claim 15 further comprising a stored address processor to execute the instructions to update the numeric Internet protocol address for the call processor by querying a domain name system server to obtain a current numeric Internet protocol address for the call processor.

* * * * *